(12) United States Patent
Mimura et al.

(10) Patent No.: US 8,130,690 B2
(45) Date of Patent: Mar. 6, 2012

(54) COMMUNICATION SYSTEM AND GATEWAY

(75) Inventors: Nodoka Mimura, Kunitachi (JP); Norihisa Matsumoto, Fuchu (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 603 days.

(21) Appl. No.: 12/326,934

(22) Filed: Dec. 3, 2008

(65) Prior Publication Data
US 2009/0143090 A1    Jun. 4, 2009

(30) Foreign Application Priority Data
Dec. 4, 2007    (JP) ................................. 2007-313635

(51) Int. Cl.
*H04H 20/71* (2008.01)
(52) U.S. Cl. ........................ 370/312; 370/400; 455/90.2
(58) Field of Classification Search .................. 370/312, 370/352–356, 389–390, 392, 400–401, 428–429, 370/432, 465–466, 474–475; 455/90.2, 403, 455/404.1, 517–519
See application file for complete search history.

(56) References Cited

U.S. PATENT DOCUMENTS

| | | | | |
|---|---|---|---|---|
| 7,428,225 B2 * | 9/2008 | Uchida | | 370/329 |
| 7,460,838 B2 * | 12/2008 | Hasegawa | | 455/90.2 |
| 7,580,685 B2 * | 8/2009 | Kanazawa | | 455/90.1 |
| 7,860,524 B2 * | 12/2010 | Laible et al. | | 455/518 |
| 7,970,425 B2 * | 6/2011 | Balachandran et al. | | 455/519 |
| 7,991,419 B2 * | 8/2011 | Matsumoto et al. | | 455/518 |
| 2002/0173325 A1 * | 11/2002 | Rosen et al. | | 455/518 |
| 2002/0196781 A1 * | 12/2002 | Salovuori | | 370/352 |
| 2005/0239485 A1 * | 10/2005 | Kundu et al. | | 455/519 |
| 2006/0171389 A1 * | 8/2006 | Hasegawa | | 370/390 |
| 2007/0171861 A1 * | 7/2007 | Akhtar | | 370/329 |
| 2009/0143029 A1 * | 6/2009 | Matsumoto et al. | | 455/90.2 |

OTHER PUBLICATIONS

Yoshida, N. et al, "System Development of the PushTalk Service," NTT DoCoMo, vol. 13, No. 4., pp. 6-13, 2006.

* cited by examiner

*Primary Examiner* — Kevin Mew
(74) *Attorney, Agent, or Firm* — Antonelli, Terry, Stout & Kraus, LLP.

(57) ABSTRACT

There is provided a communication system in which semi-duplex many-to-many multicasting service can be performed to both a mobile station and a base station by using a unified call control protocol such as SIP on an IP network, and can contain mobile stations and base stations of existing wireless facilities. The communication system in which the semi-duplex many-to-many multicasting service is performed to plural mobile stations 100a, 100b 100c and 110 includes a gateway 104a to convert a first protocol to connect the mobile station 100a, a base station 101a and the gateway 104a, and a second protocol to connect the gateway 104a, a call control server 105 and a press-talk server 106. The gateways 104a, 104b, 104c and 114a perform the protocol conversion for both communication to the mobile station and communication to the base station, so that the semi-duplex many-to-many press-talk can be realized.

20 Claims, 38 Drawing Sheets

| MOBILE STATION NUMBER 701 | BASE STATION NUMBER 702 |
|---|---|
| 12340001 | 01 |
| 12340002 | 02 |
| 12340003 | 02 |
| . . . | . . . |

FIG. 7

| PROXY MODULE NUMBER | TYPE | DEVICE IDENTIFIER (MOBILE STATION NUMBER /BASE STATION NUMBER) | MOBILE STATION ADDRESS /BASE STATION ADDRESS | SPECIFIC INFORMATION |
|---|---|---|---|---|
| 1 | MOBILE STATION | 12340001 | ms1@netA | ENABLED SERVICE: PRESS-TALK<br>PRIOR ADDRESS IN INCOMING CALL: ms4@netA<br>REFUSED ADDRESS IN INCOMING CALL: *@netB |
| 2 | BASE STATION | 01 | bs1@netA | ENABLED SERVICE: PRESS-TALK |
| ... | ... | ... | ... | ... |

FIG. 8

| 507 | MOBILE STATION ADDRESS (901) | SPECIFIC INFORMATION (902) |
|---|---|---|
| | ms1@netA | ENABLED SERVICE: PRESS-TALK<br>PRIOR ADDRESS IN INCOMING CALL: ms4@netA<br>REFUSED ADDRESS IN INCOMING CALL: *@netB |
| | ms2@netA | ENABLED SERVICE: PRESS-TALK<br>REFUSED ADDRESS IN INCOMING CALL: *@netB |
| | ... | |

FIG. 9

| FORWARDING CONTROL MODULE NUMBER 1001 | TYPE 1002 | PROXY MODULE NUMBER 1003 | MOBILE STATION ADDRESS /BASE STATION ADDRESS /GROUP ADDRESS 1004 |
|---|---|---|---|
| 1 | MOBILE STATION | 1 | ms1@netA |
| 2 | BASE STATION | 2 | bs1@netA |
| 3 | GROUP | — | 3003@ptserver.netB |
| ... | ... | ... | ... |

| GROUP NUMBER | GROUP MEMBER ADDRESS |
|---|---|
| 0001 | ms1@netA, ms2@netA |
| 0002 | ms3@netA, ms4@netA, 3002@ptserver.netB |
| 0003 | ms1@netA, ms2@netA, ms3@netA, 3003@ptserver.netB |
| 1001 | bs2@netA, bs3@netA, 4001@ptserver.netB |
| ... | ... |

1601 MESSAGE: INVITE
1602 FROM: 0003@ptserver.netA
1603 TO: ms2@netA
...
1604 ADDRESS LIST
   ms2@netA
   ms3@netA

1700

1701 MESSAGE: OK RESPONSE
1702 FROM: 0003@ptserver.netA
1703 TO: ms2@netA
...
1704 ADDRESS LIST:
ms2@netA
ms3@netA

MESSAGE: BYE — 2601
FROM: 0003@ptserver.netA — 2602
TO: ms2@netA — 2603
...
ADDRESS LIST: — 2604
ms2@netA
ms3@netA

FIG. 26

| MOBILE STATION ADDRESS /BASE STATION ADDRESS | GATEWAY ADDRESS |
|---|---|
| ms1@netA | 192.168.10.1 |
| ms2@netA | 192.168.10.2 |
| bs1@netA | 192.168.10.1 |
| ... | ... |

FIG. 34

COMMUNICATION SYSTEM AND GATEWAY

CLAIM OF PRIORITY

The present application claims priority from Japanese patent application JP 2007-313635 filed on Dec. 4, 2007, the content of which is hereby incorporated by reference into this application.

BACKGROUND OF THE INVENTION

1. Field of the Invention

The present invention relates to a communication system and a gateway, and particularly to a communication system and a gateway which can be applied to a radio communication system to realize semi-duplex many-to-many multicasting service or a professional wireless system containing plural radio systems.

2. Description of the Related Art

In a professional wireless system such as a disaster prevention and administrative radio system and a fire radio system, it is indispensable that semi-duplex many-to-many multicasting service can be performed in which application data (voice, image, short message, etc.) can be exchanged among plural mobile stations. In recent years, on the assumption that the IP (Internet Protocol) network is used, it is socially requested to configure a professional wireless system. Hitherto, professional wireless systems are independently managed for the respective organizations. However, it is requested that the interconnection between the systems can be easily realized by the IP so that the organizations can communicate to each other the time of disaster or the like. Especially, it is desired that the protocol of call control is based on the SIP (Session Initiation Protocol).

As a system in which the semi-duplex many-to-many multicasting service is performed among plural mobile stations on the IP network, there is a method disclosed in non-patent document 1. The method disclosed in non-patent document 1 is a method based on PoC (Push to talk Over Cellular) determined by OMA (Open Mobile Alliance) which is a standard-setting organization. The PoC is the typical specification for performing the semi-duplex many-to-many multicasting service among mobile stations capable of performing IP communication. According to this, a PoC system includes a PoC server, mobile stations called PoC clients, and a SIP server. The PoC server is a press-talk server which performs call connection to plural mobile stations as objects of the multicasting service, and delivers application data. Besides, the PoC server assigns and notifies the floor to the mobile station in order to determine the sender of application data. The PoC server and the mobile station exchanges call control signals of the SIP through the SIP server.

Non-patent document 1: System Development of Push Talk Service, NTT DoCoMo Technical Journal Vol. 13, No. 4, p 6-13

SUMMARY OF THE INVENTION

In the professional wireless system, application data must be delivered to a very large number of mobile stations in one multicasting service, however, the radio resource which can be used in one system is limited. Thus, a method is adopted in which application data is first delivered to the base station, and is broadcast from the base station to plural mobile stations while one radio channel is used. By adopting the method as stated above, when plural mobile stations to which application data is to be delivered exist under one base station, the consumption of the radio resource is avoided. In the professional wireless system, as the destination address for which the call control of the multicasting service is performed, there is a case where the mobile station is specified and a case where the base station is specified. In the case where the mobile station is specified, the professional wireless system follows the base station where the mobile station exists, and performs delivery while dynamically selecting the base station. On the other hand, when the base station is specified, the delivery is fixedly performed to the specific base station.

However, in the method disclosed in non-patent document 1, consideration is not paid to the delivery system specific to the professional wireless system. In the professional wireless system, the call connection is performed for the base station existing between the PoC server and the mobile station. Thus, when existing wireless facilities (mobile stations and base stations) for the professional wireless system are used, in general, the method disclosed in non-patent document 1 can not be directly applied to the professional wireless system.

It is an object of the present invention to provide a communication system in which semi-duplex many-to-many multicasting service (press-talk) can be performed for both a mobile station and a base station by using a worldwide standard of call control protocol such as the SIP on the IP network, and which can contain mobile stations and base stations of plural existing wireless facilities not supporting the standard call control protocol such as the SIP.

A communication system of the invention includes a mobile station, a base station, a gateway, a call control server, and a press-talk server, the mobile station, the base station and the gateway perform communication by a first protocol, the press-talk server and the gateway perform communication by a second protocol through the call control server, the press-talk server realizes semi-duplex many-to-many multicasting service for plural mobile stations and plural base stations, and the gateway includes a protocol conversion section to convert the first protocol and the second protocol, and a forwarding control section to call the protocol conversion section for both the communication with the mobile station and the communication with the base station from the press-talk server.

According to the first solving means of the present invention, there is provided a communication system in which a press-talk call start request is received from a mobile station in a group and semi-duplex many-to-many multicasting service to other mobile stations as members of press-talk is realized, the communication system comprising:

a first press-talk server that sends a first call control signal of multicasting service including a group address as an identifier of the press-talk and an address list of one or more mobile station addresses as members of the press-talk or one or more base station addresses to a second gateway in order to perform call connection to a member of the press-talk belonging to the second gateway different from a first gateway which communicates with a first base station receiving the press-talk call start request, wherein when receiving the first call control signal of the multicasting service, the second gateway extracts all addresses specified as destinations from the address list, (1) where the extracted addresses are mobile station addresses, the second gateway searches, based on a mobile station number for each mobile station address included in the address list included in the first call control signal of the multicasting service, a mobile station location information table storing mobile station numbers of the mobile stations and base station numbers of base stations having the mobile stations under the base stations, when a press-talk call of the press-talk is not set up for the specified second base station, the second gateway sends press-talk call setup indication to the second base station, when receiving the press-talk call setup indication, the second base station performs radio channel configuration to perform press-talk to one or more mobile stations under the second base station included in the address list, (2) where the extracted destination addresses are base station addresses, when press-talk call is not set for the second base station of each base station address included in the address list included in the first call control signal of the multicasting service, the second gateway sends press-talk call setup indication to the second base station, when receiving the press-talk call setup indication, the second base station performs radio channel configuration to deliver the press-talk, and wherein the gateway realizes the semi-duplex many-to-many multicasting service to both communication of the first call control signal of the multicasting service to the mobile station from the first press-talk server and communication of the first call control signal of the multicasting service to the base station.

According to the second solving means of the present invention, there is provided a gateway in a communication system in which a press-talk call start request is received from a mobile station in a group and semi-duplex many-to-many multicasting service to other mobile stations as members of press-talk is realized, comprising:

a second gateway receives a first call control signal of multicasting service including a group address as an identifier of the press-talk and an address list of one or more mobile station addresses as members of the press-talk or one or more base station addresses from a first press-talk server in order to perform call connection to a member of the press-talk belonging to the second gateway different from a first gateway which communicates with a first base station receiving the press-talk call start request, wherein when receiving the first call control signal of the multicasting service, the second gateway extracts all addresses specified as destinations from the address list, (1) where the extracted addresses are mobile station addresses, the second gateway searches, based on a mobile station number for each mobile station address included in the address list included in the first call control signal of the multicasting service, a mobile station location information table storing mobile station numbers of the mobile stations and base station numbers of base stations having the mobile stations under the base stations, when a press-talk call of the press-talk is not set up for the specified second base station, the second gateway sends press-talk call setup indication to the second base station, the second gateway makes the second base station perform radio channel configuration to perform press-talk to one or more mobile stations under the second base station included in the address list, when the second base station receives the press-talk call setup indication, (2) where the extracted destination addresses are base station addresses, when press-talk call is not set for the second base station of each base station address included in the address list included in the first call control signal of the multicasting service, the second gateway sends press-talk call setup indication to the second base station, the second gateway makes the second base station perform radio channel configuration to deliver the press-talk, and wherein the gateway realizes the semi-duplex many-to-many multicasting service to both communication of the first call control signal of the multicasting service to the mobile station from the first press-talk server and communication of the first call control signal of the multicasting service to the base station.

In the communication system of the invention, a call control signal can be sent and received from the press-talk server to the gateway without changing the call control protocol between the mobile station and the base station, and an existing wireless facility for a professional wireless system can be used.

BRIEF DESCRIPTION OF THE DRAWINGS

FIG. 7 is a data structural view of a mobile station location information table.

FIG. 8 is a data structural view of a proxy module management table.

FIG. 9 is a data structural view of a mobile station specific information table.

FIG. 10 is a data structural view of a forwarding control module management table.

FIG. 15 is a data structural view of a group member table.

FIG. 16 is a format view of an INVITE message including an address list.

FIG. 17 is a format view of an OK response message including an address list.

FIG. 26 is a format view of a BYE message including an address list.

FIG. 34 is a data structural view of a contact address information table.

DETAILED DESCRIPTION OF THE INVENTION

1. System

Figure 1:
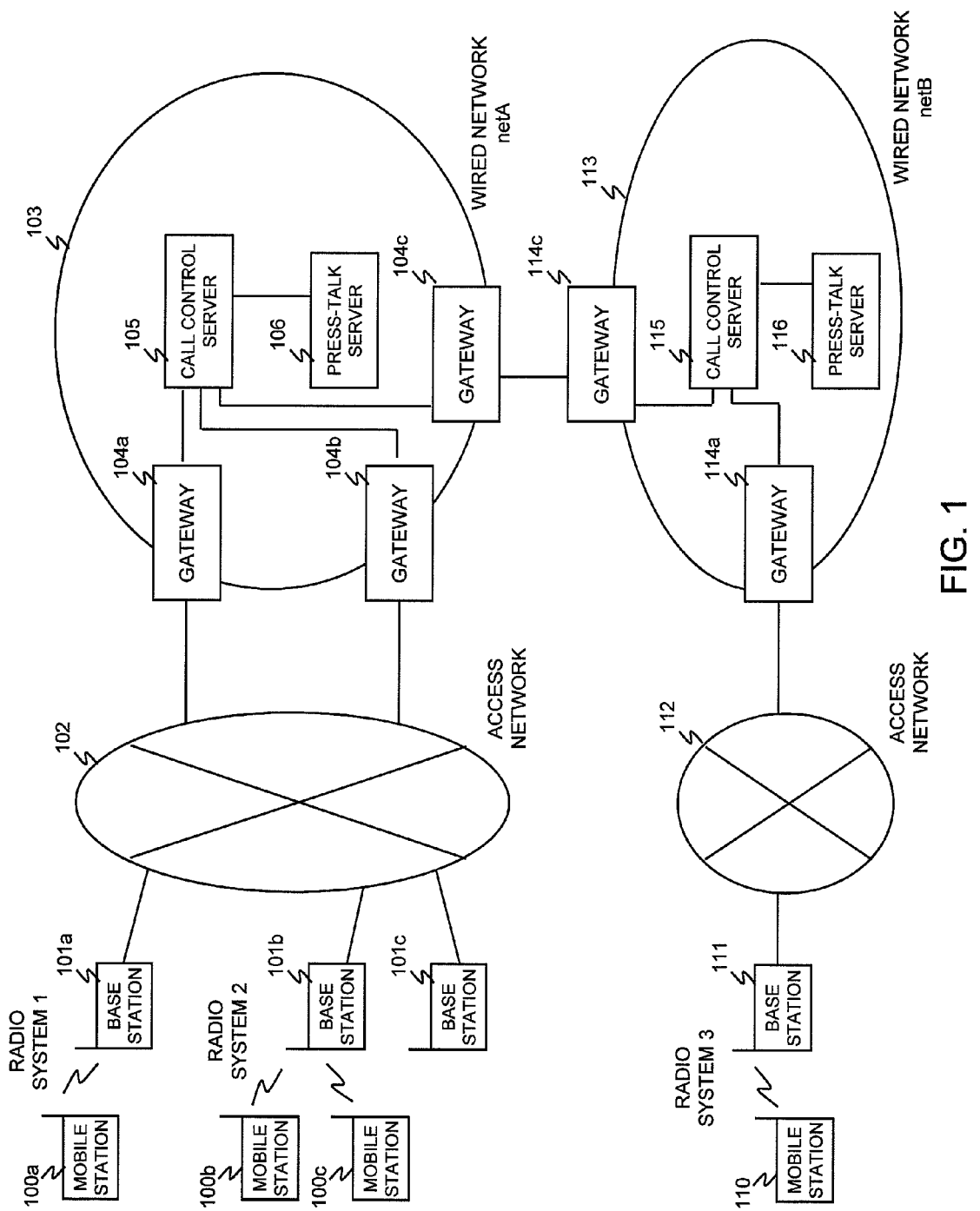
FIG. 1 is a structural view of a communication network of an embodiment.

FIG. 1 is a structural view of a communication network of an embodiment.

A mobile station 100a performs radio communication with a base station 101a by using a radio system 1. The base station 101a performs IP communication with a gateway 104a through an access network 102. The gateway 104a sends call control signals for performing call connection and call disconnection to the base station 101a, and controls the base station 101a. Similarly, a mobile station 100b, 100c performs radio communication with a base station 101b by using a radio system 2. Besides, when the mobile station 100b, 100c exists at a location physically closer to a base station 101c than to the base station 101b, the mobile station can perform radio communication with the base station 101c by using the radio system 2. The base station 101b, 100c performs IP communication with a gateway 104b through the access network 102. The gateway 104b sends call control signals for performing call connection and call disconnection to the base station 101b, 100c, and controls the base station 101b, 100c. The protocol of the call control signal is arbitrary. For example, the protocol is a protocol obtained by extending Q.931 used in the call control of ISDN (Integrated Services Digital Network). A wired network 103 is an IP network whose domain name is netA, and includes the gateways 104a, 104b and 104c, a call control server 105, and a press-talk server 106. The gateways 104a, 104b and 104c perform communication of the call control signal with the press-talk server 106 through the call control server 105. The protocol of the call control signal is the SIP. That is, the call control server 105 is an SIP server. The press-talk server 106 is the server for realizing semi-duplex many-to-many multicasting service (hereinafter referred to as press-talk) among plural mobile stations. When voice data of press-talk is delivered to a specific mobile station or a specific base station, the press-talk server 106 performs call connection to a suitable gateway through the call control server 105, and delivers the voice data to the gateway. The gateway 104c performs IP communication with a gateway 114c. A wired network 113 is an IP network whose domain name is netB, and includes gateways 114a and 114c, a call control server 115, and a press-talk server 116. The gateway 114a performs IP communication with a base station 111 through an access network 112. The gateway 114a sends call control signals for performing call connection and call disconnection to the base station 111, and controls the base station 111. The base station 111 uses a radio system 3 and performs radio communication with a mobile station 110.

Figure 2:
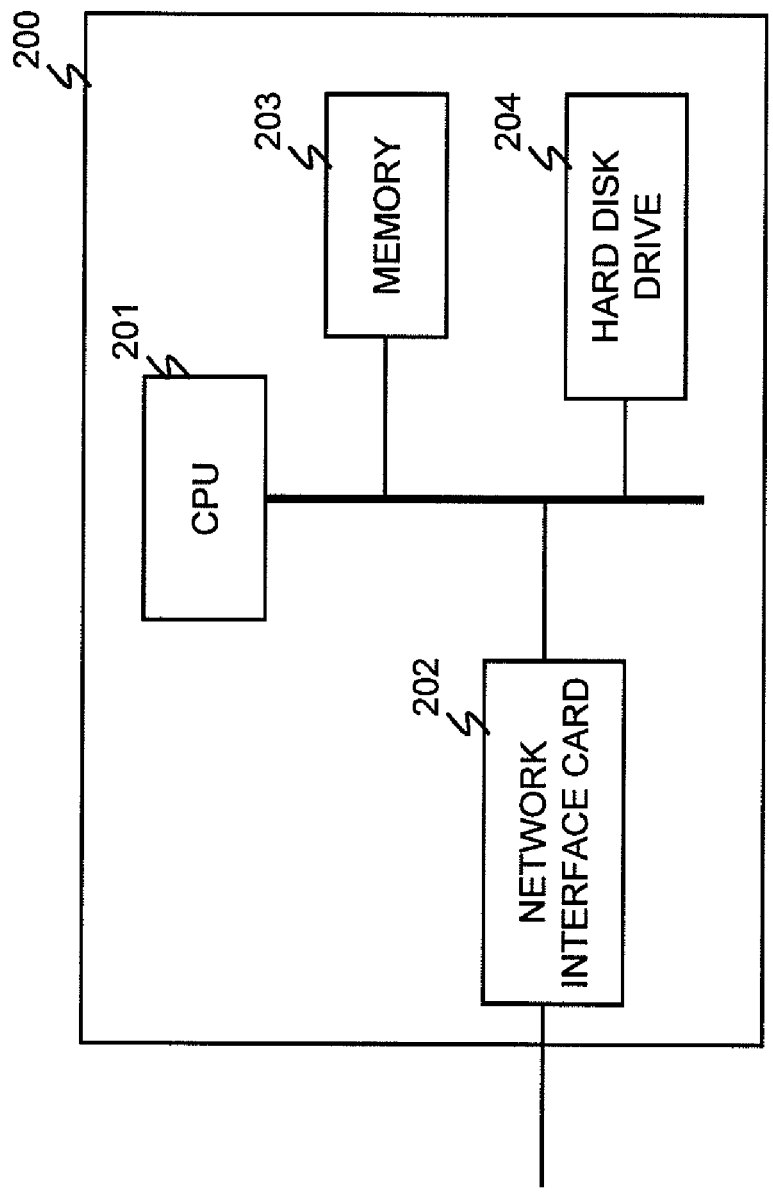
FIG. 2 is a structural view of device hardware.

FIG. 2 is a hardware structural view common to the press-talk server 106, the gateway 104a and the call control server 105. A CPU 201 to perform an arithmetic operation, a network interface card 202 to perform IP communication with an external device, a memory 203 to store a program under execution and data used by the program, and a hard disk drive 204 to store programs and data are provided in the inside of a housing 200.

Next, the inner structural views of memories of respective devices will be described by use of FIGS. 3, 4 and 5.

Each module of a program area is loaded to the CPU 201 and is executed. Besides, each table of a data area is suitably accessed by the CPU 201 and is read and/or written.

Figure 3:
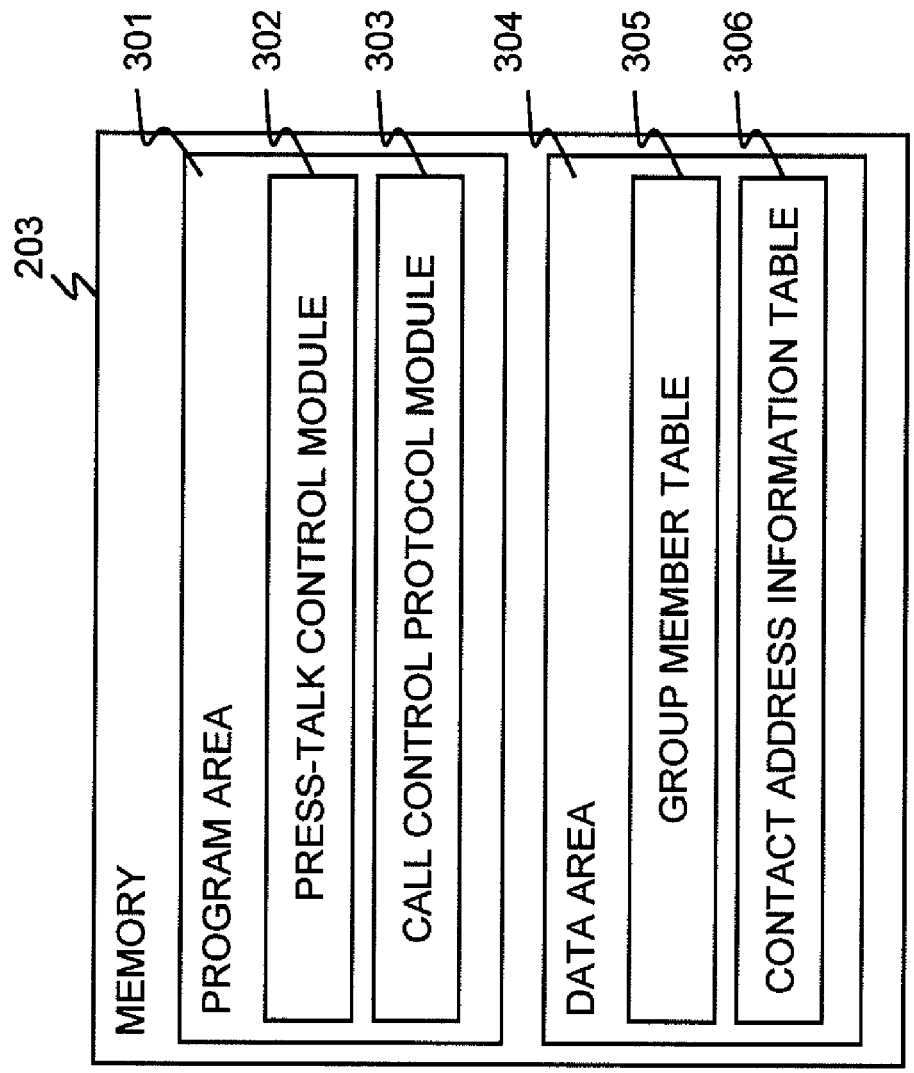
FIG. 3 is an inner structural view of a memory in a press-talk server.

FIG. 3 is an inner structural view of the memory 203 of the press-talk server 106. A program area 301 includes a press-talk control module 302 and a call control protocol module 303. The press-talk control module 302 selects a destination of call connection in order to perform press-talk, and deliveries voice data of press-talk after the call connection. The call control protocol module 303 is a protocol stack of the SIP, and manages a call. A data area 304 includes a group member table 305 and a contact address information table 306. The group member table 305 stores a correspondence relation between a group address of press-talk and a destination of press-talk. The contact address information table 306 stores a correspondence relation between a mobile station address used as a destination of a SIP message or a base station address and a gateway. The press-talk control module 302 and the call control protocol module 303 are loaded to the CPU 201, and the respective procedures are executed.

Figure 4:
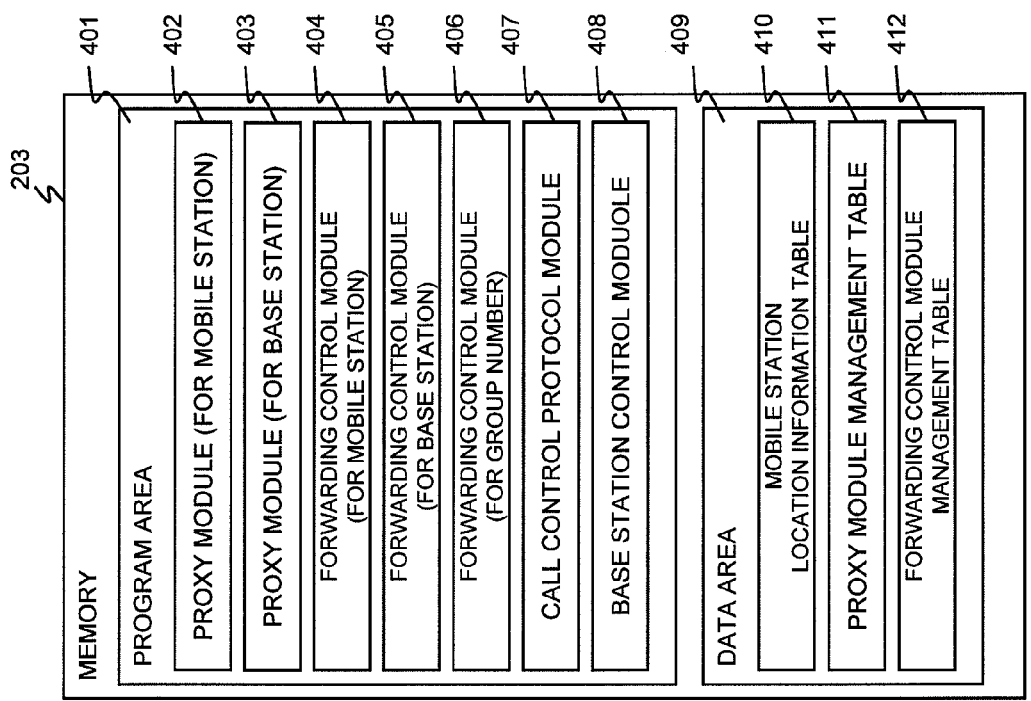
FIG. 4 is an inner structural view of a memory in a gateway.

FIG. 4 is an inner structural view of the memory 203 of the gateway 104a. A program area 401 includes a proxy module (for mobile station) 402, a proxy module (for base station) 403, a forwarding control module (for mobile station) 404, a forwarding control module (for base station) 405, a forwarding control module (for group member) 406, a call control protocol module 407, and a base station control module 408. The proxy module (for mobile station) 402 performs protocol conversion of a call control signal by the SIP to a mobile station and a particular call control signal (e.g. the extensional Q.931) to the base station where the mobile station exists. The proxy module (for base station) 403 performs protocol conversion of a call control signal by the SIP to a base station and a particular call control signal to the base station. The proxy module 402 or 403 acts for the mobile station or the base station, and is assigned a mobile station address or a base station address used as a destination of an SIP message. The forwarding control module (for mobile station) 404 exchanges the call control signal to the mobile station with the press-talk control module 302 of FIG. 3. The forwarding control module (for base station) 405 exchanges the call control signal to the base station with the press-talk control module 302. The forwarding control module (for group member) 406 exchanges the call control signal to the group address with the press-talk control module 302. Besides, the forwarding control module (for group member) 406 exchanges the call control signal to the group address with the forwarding control module (for group member) of another gateway. The call control protocol module 407 is a protocol stack of the SIP, and performs management of a call. The base station control module 408 is a particular call control protocol stack (e.g. the extensional Q.931) to a base station, and controls a radio channel of the base station. A data area 409 includes a mobile station location information table 410, a proxy module management table 411, and a forwarding control module management table 412. The mobile station location information table 410 stores a correspondence relation between a mobile station and a base station where the mobile station exists. The proxy module management table 411 stores information necessary for the proxy module 402, 403 to perform the protocol conversion. The forwarding control module management table 412 stores a correspondence relation between the forwarding control module 404, 405, 406 and the proxy module 402, 403. By adopting the program structure as stated above, the gateway can perform the protocol conversion for both the call control signal to the mobile station sent from the press-talk server and the particular call control signal to the base station. Besides, by performing the protocol conversion as stated above, an existing wireless facility for a professional wireless system can be used. At this time, the press-talk server does not depend on the call control protocol between the existing wireless facility and the gateway, and can send a SIP message to the mobile station and a SIP message to the base station. The proxy module (for mobile station) 402, the proxy module (for base station) 403, the forwarding control module (for mobile station) 404, the forwarding control module (for base station) 405, the forwarding control module (for group member) 406, the call control protocol module 407, and the base station control module 408 are loaded to the CPU 201 and the respective procedures are executed.

Figure 5:
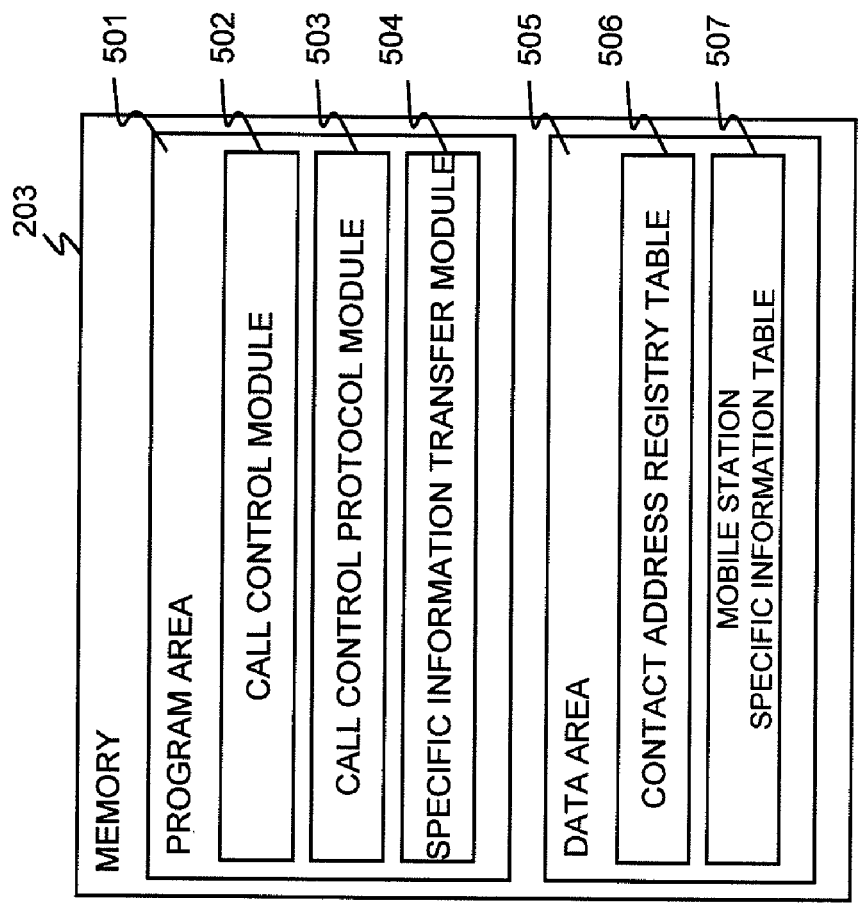
FIG. 5 is an inner structural view of a memory in a call control server.

FIG. 5 is an inner structural view of the memory 203 of the call control server 105. A program area 501 includes a call control module 502, a call control protocol module 503, and a specific information transfer module 504. The call control module 502 performs routing of a SIP message. The call control protocol module 503 is a protocol stack of the SIP and manages a call. The specific information transfer module 504 transfers specific information of a mobile station to the proxy module (for mobile station) 402 of FIG. 4. A data area 505 includes a contact address registry table 506 and a mobile station specific information table 507. The contact address registry table 506 stores a correspondence relation between a mobile station address or a base station address and a gateway. The mobile station specific information table 507 stores specific information of a mobile station. The call control module 502, the call control protocol module 503 and the specific information transfer module 504 are loaded to the CPU 201, and the respective procedures are executed.

The above is the whole structure of the communication system of the invention and the inner structures of the respective devices.

2. Procedure

Next, a description will be given to three flows necessary to provide press-talk in the communication system of this embodiment. Specifically, there are flows of (A) location registration of a mobile station, (B) call connection for starting press-talk, and (C) call disconnection for ending the press-talk.

(A) Location Registration of the Mobile Station

Figure 6:
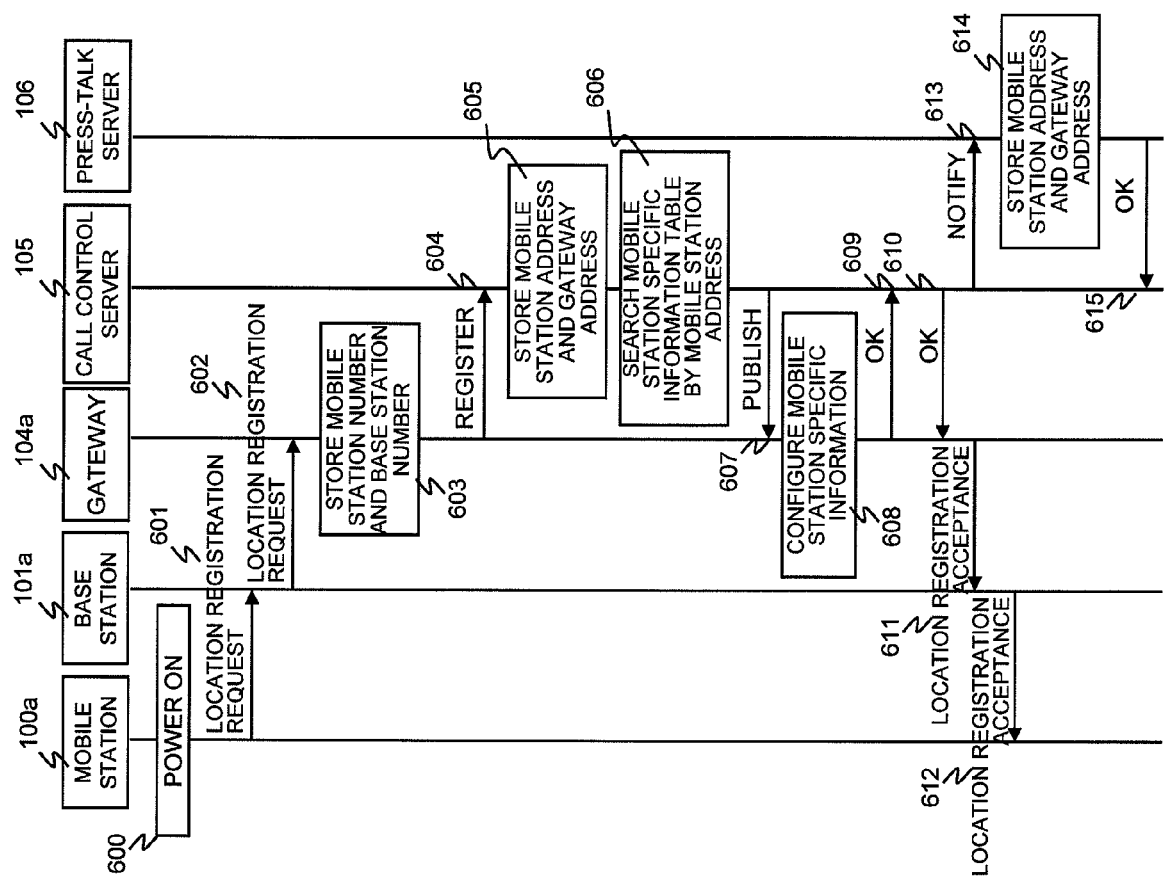
FIG. 6 is a sequence view of location registration.

FIG. 6 is a sequence view of location registration. This view shows a flow in which, when power to the mobile station 100a is turned on, the location registration is performed for the communication system of this embodiment.

In the flow of the location registration, the respective devices prepare to provide press-talk. First, the power to the mobile station 100a is turned on (step 600). Thereafter, a location registration request is sent to the base station 101a which can perform radio communication and exists at the nearest position (step 601). When receiving that, the base station 101a sends the location registration request to the gateway 104a (step 602). This message includes the mobile station number of the mobile station 100a and the base station number of the base station 101a. The gateway 104a stores the mobile station number and the base station number included in the location registration request into the mobile station location information table 410 (step 603).

FIG. 7 is a data structural view of the mobile station location information table 410 of the gateway 104a. A mobile station number 701 and a base station number 702 are stored. In this example, the mobile station number of the mobile station 100a is 12340001, and the base station number of the base station 101a is 01.

Referring back to FIG. 6, the gateway 104a creates a proxy module of the mobile station 100a, and allocates the mobile station address used in the SIP in accordance with a previously determined suitable method, rule or the like. In this example, the mobile station address of ms1@netA is allocated. REGISTER of a location registration message including the mobile station address is sent to the call control server 105 (step 604). The call control server 105 stores the mobile station address included in the REGISTER and the IP address of the gateway 104a of the transfer source into the contact address registry table 506 (step 605). Thereafter, the call control server 105 searches the mobile station specific information table 507 by the mobile station address (step 606).

FIG. 9 shows the mobile station specific information table 507 of the call control server 105. The mobile station specific information table 507 is previously set and stores a mobile station address 901 and specific information 902 of the mobile station. The specific information 902 includes an enabled service for the mobile station, a prior mobile station address in incoming call, a refused mobile station address in incoming call and the like. In this example, with respect to ms1@netA, the enabled service is press-talk, the prior address in incoming call is ms4@netA, and the refused address in incoming call is all addresses of domain netB. These information are previously statically set by an administrator or the like.

Referring back to FIG. 6, when an entry exists in the mobile station specific information table 507, the call control server 105 sends PUBLISH to the gateway 104a (step 607). This message includes specific information for the mobile station address under location registration. When receiving the PUBLISH, the gateway 104a stores the included specific information in the proxy module management table 411 (step 608).

FIG. 8 shows the proxy module management table 411 of the gateway 104a. A number 801 for identifying a proxy module, a type 802 of the proxy module, a device identifier 803 (mobile station number or base station number) to indicate that the proxy module is created for which device, a mobile station address or a base station address 804, and a specific information 805 are stored. Incidentally, a previously determined index or an identification number can be suitably stored in the proxy module number. When the type 802 is a mobile station, the specific information included in the PUBLISH received at step 607 of FIG. 6 is stored in the specific information 805. In this example, the number of the proxy module created for the mobile station 100a is 1, the type is the mobile station, the mobile station number is 12340001, the mobile station address is ms1@netA, and the specific information is the same as the information configured in the mobile station specific information table 507. Besides, an entry whose proxy module number is 2 is for the base station. In this example, since the base station is not moved, it is assumed that the administrator or the like previously sets the entry for the base station.

Referring back to FIG. 6, the gateway 104a sends back an OK response for the PUBLISH of step 607 to the call control server (step 609). Thereafter, the call control server 105 sends back the OK response for the REGISTER of step 604 (step 610). When receiving the OK response, the gateway 104a sends location registration acceptance to the base station 101a as a reply to the location registration request received at step 602 (step 611). The base station 101a sends location registration acceptance to the mobile station 100a as a reply to the location registration request received at step 601 (step 612). On the other hand, the call control server 105 sends NOTIFY to the press-talk server 106 after step 610 (step 613). Incidentally, the NOTIFY may be sent before or at the same time as step 610. This message includes the mobile station address and the IP address of the gateway stored at step 605. In order to transmit this NOTIFY, it is necessary that the press-talk server 106 previously makes a sending reservation (sends SUBSCRIBE) with the call control server 105. When receiving the NOTIFY, the press-talk server 106 stores the mobile station address and the IP address of the gateway included therein into the contact address information table 306 (step 614). The press-talk server 106 sends back an OK response for the received NOTIFY (step 615).

FIG. 34 is the contact address information table 306 of the press-talk server 106. A mobile station address or a base station address 3401 and an IP address 3402 of a gateway are stored. The entry of the mobile station is dynamically determined when for example, the mobile station registers the location. Besides, the entry of the base station can be statically determined. In this example, the entry in which the mobile station address is ms1@netA and the IP address of the gateway is 192.168.10.1 are stored at step 614 of FIG. 6.

The above is the flow in which the mobile station performs the location registration for the communication system of the embodiment. The features in this flow are steps 606, 607 and 608 of FIG. 6. Next, the action of the devices including these steps will be described.

Figure 11:
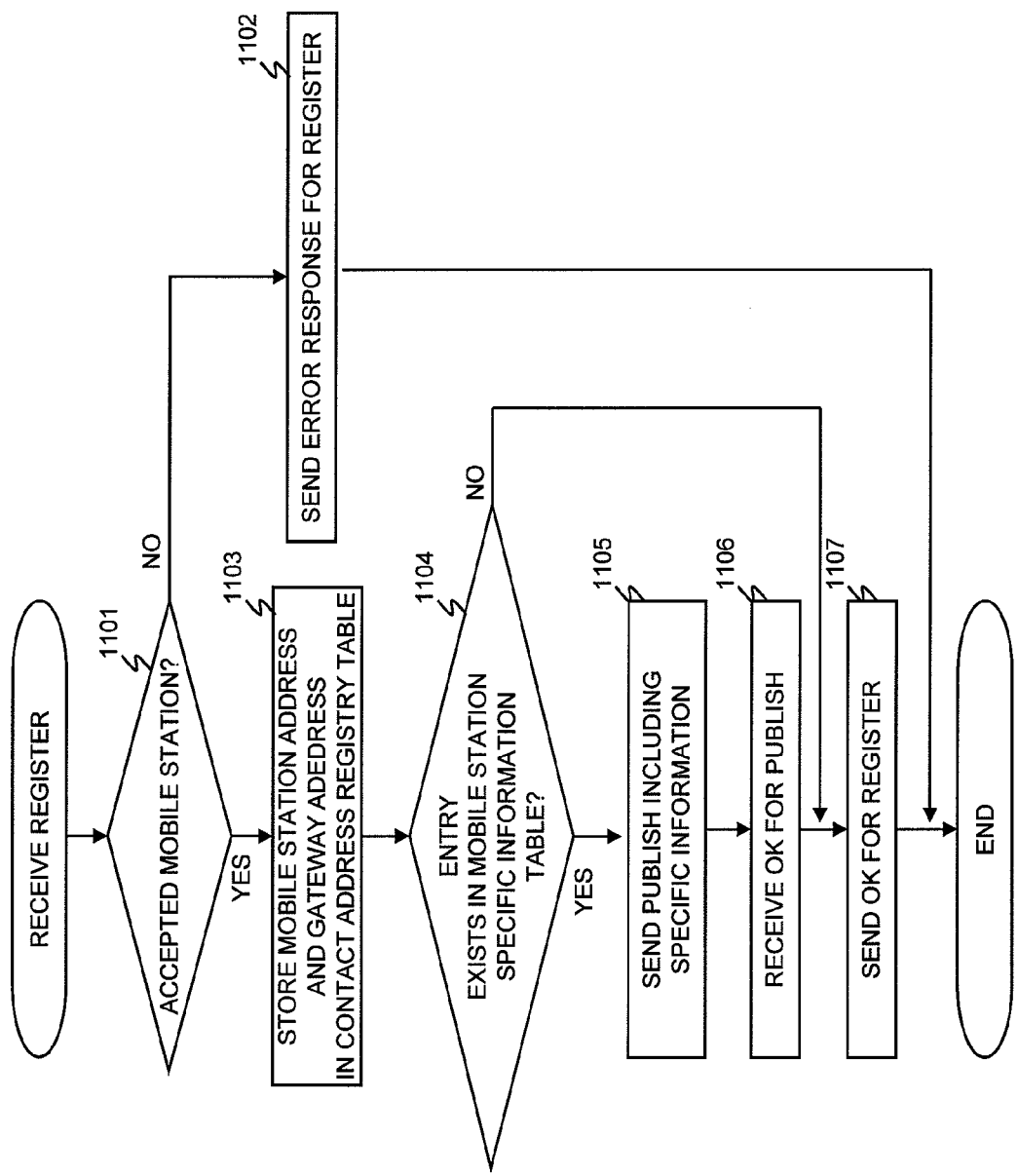
FIG. 11 is a flowchart in which a call control server receives REGISTER.

FIG. 11 is a flowchart which starts when the call control server 105 receives the REGISTER from the gateway 104a at step 604 of FIG. 6. The call control server 105 first checks whether the mobile station address included in the REGISTER is to be accepted (step 1101). When the mobile station address is not to be accepted, an error response is sent for the REGISTER, and the procedure is ended (step 1102). When the mobile station address is to be accepted, the mobile station address and the IP address of the gateway as the source address of REGISTER are stored in the contact address registry table 506 (step 1103). Thereafter, the call control server 105 refers to the entry of the mobile station specific information table 507 of FIG. 9 by the mobile station address (step 1104). When the entry exists in the mobile station specific information table 507, the specific information of the entry is included in PUBLISH, and the PUBLISH is sent to the gateway of the source of REGISTER (step 1105). The call control server 105 stands by until receiving OK response for the PUBLISH (step 1106). At step 1104, when the entry does not exist in the mobile station specific information table 507, steps 1105 and 1106 are omitted. Thereafter, the call control server sends OK response for the REGISTER (step 1107).

Figure 12:
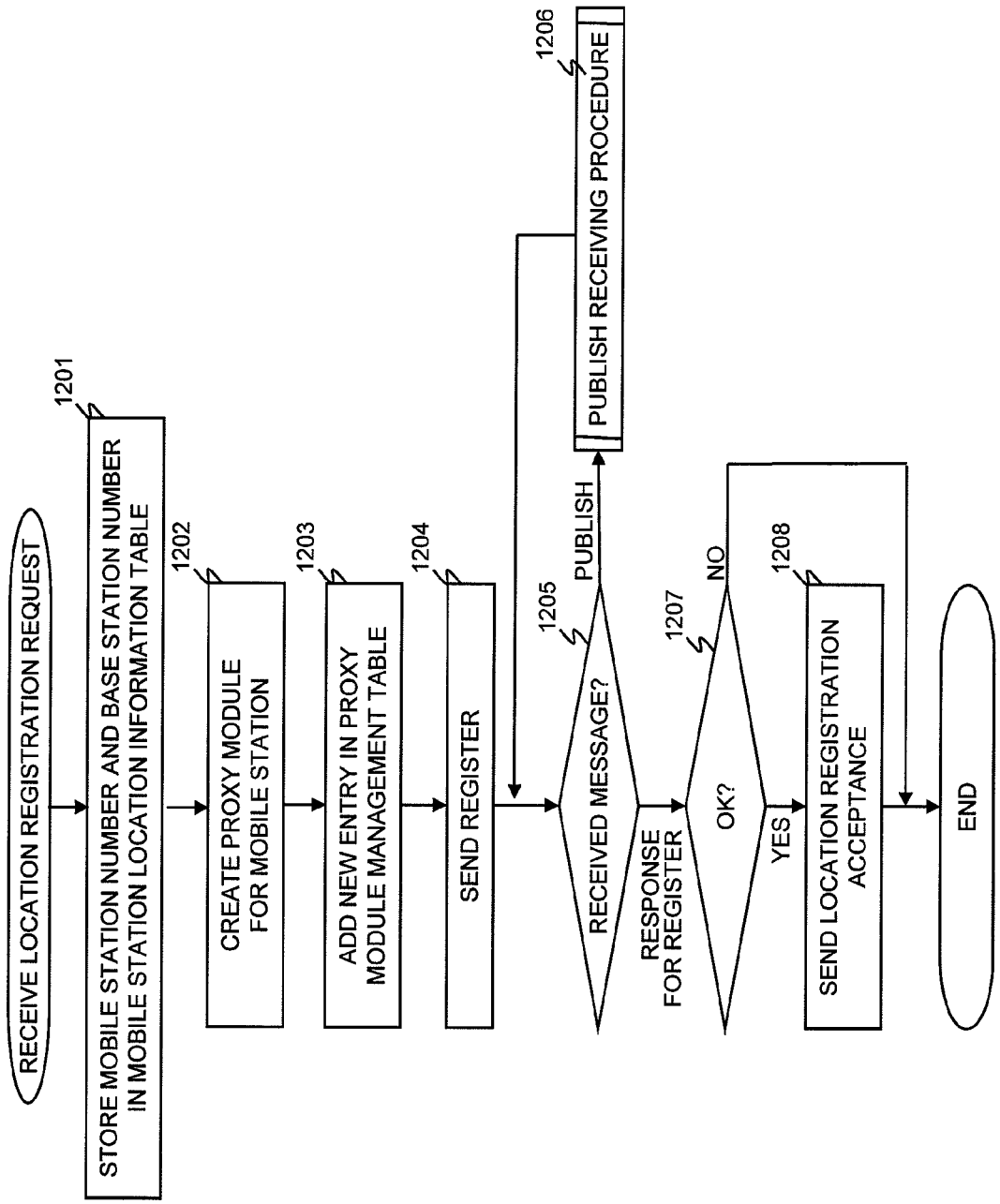
FIG. 12 is a flowchart in which a gateway receives a location registration request.

FIG. 12 is a flowchart which starts when the gateway 104a receives the location registration request of the mobile station 100a from the base station 101a at step 602 of FIG. 6. When receiving the location registration request, the gateway 104a stores the mobile station number included in the message and the base station number as the source address of the request into the mobile station location information table 410 of FIG. 7 (step 1201). A proxy module to act for the mobile station 100a is created, and a proxy module number and a mobile station address are allocated (step 1202). The proxy module number, the type of the proxy module, the mobile station number and the mobile station address are stored in the proxy module management table 411 of FIG. 8 (step 1203). From the created proxy module, REGISTER as a location registration message in the SIP is sent to the call control server 105 (step 1204).

Thereafter, the gateway 104a stands by until receiving the message from the call control server 105 (step 1205). When the message is PUBLISH, a PUBLISH receiving procedure is performed, and then the procedure goes back to step 1205 (step 1206). When the message received at step 1205 is a response for the sent REGISTER, the content of the response is checked (step 1207). When the response is OK response, as the response for the first received location registration request, location registration acceptance is sent to the base station 101a, and a series of procedures are ended (step 1208). At step 1207, when the response is not the OK response, step 1208 is omitted and the procedure is ended.

Figure 13:
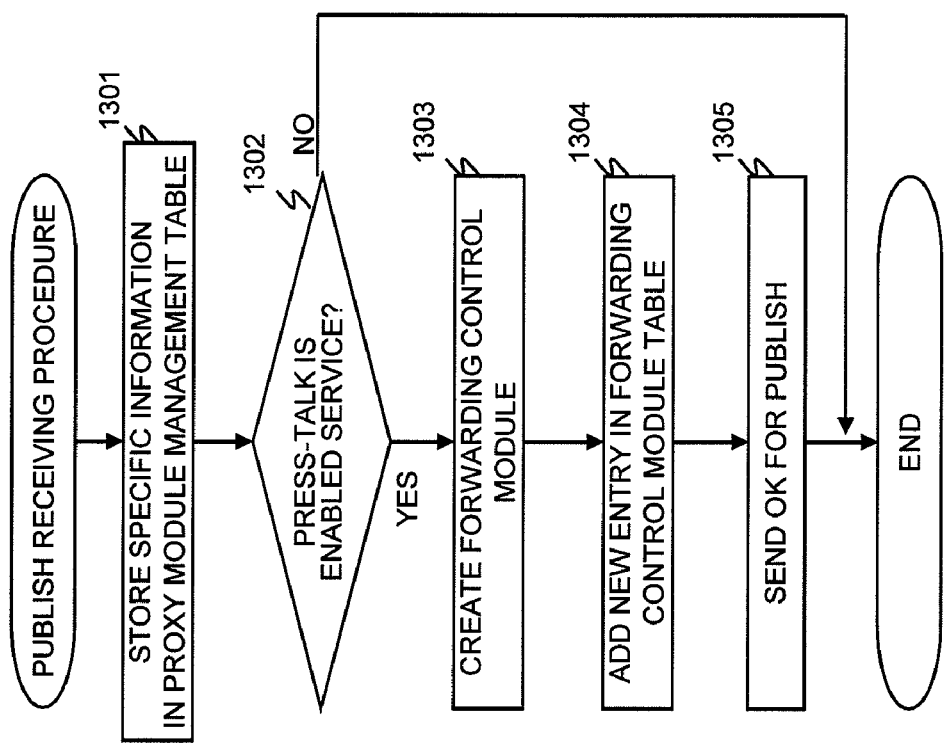
FIG. 13 is a flowchart of a PUBLISH receiving procedure.

FIG. 13 is a flowchart showing the details of the PUBLISH receiving procedure of step 1206 of FIG. 12. First, for the mobile station under location registration, the specific information included in the PUBLISH are stored in the proxy module management table 411 of FIG. 8 (step 1301). It is checked whether press-talk is an enabled service in the specific information (step 1302). When the press-talk is provided for the mobile station, a forwarding control module for forwarding a call control signal and media data to the press-talk server is created, and a forwarding control module number is allocated (step 1303). The forwarding control module number, the type of the forwarding control module, the proxy module number of the proxy module for the same mobile station, and the mobile station address allocated to the proxy module are stored in the forwarding control module management table 412 (step 1304).

FIG. 10 shows the forwarding control module management table 412 of the gateway 104a. A forwarding control module number 1001, a type 1002 of a forwarding control module, a proxy module number 1003 of a proxy module for the same mobile station, and a mobile station address 1004 allocated to the proxy module are stored. Incidentally, a previously determined index or an identification number can be suitably stored in the forwarding control module number 1001. In this example, the number of the forwarding control module corresponding to the mobile station 100a is 1, the type is a mobile station, the number of the proxy module is 1, and the mobile station address is ms1@netA. In the entry whose forwarding control module number is 2, the type of the module is a base station. The entry of the mobile station is dynamically determined. The entry of the base station is previously statically set by the administrator or the like. Besides, in the entry whose forwarding control module number is 3, the type of the module is a group. In the entry of the group, there is no corresponding proxy module. The entry of the group is previously statically set by the administrator or the like. The forwarding control module for the group is, for example, a module required when call control of press-talk crossing the system of domain netA and the system of domain netB is performed. In this example, the forwarding control module number 3 corresponds to group address 3003@ptserver.netB as the identifier of press-talk in the domain netB.

Referring back to FIG. 13, the gateway 104a sends the OK response for the PUBLISH to the call control server 105, and ends the procedure (step 1305). At step 1302, when press-talk is not provided to the mobile station, the steps 1303, 1304 and 1305 are omitted and the procedure is ended.

The above is the act of the devices including the steps 606, 607 and 608 of FIG. 6.

It is assumed that the communication system of this embodiment contains an existing wireless facility as mobile stations and base stations. In such mobile stations, there exists a mobile station which does not include a unit to send specific information other than a mobile station number to a gateway. Besides, when many base stations are installed, and they are managed by plural gateways, a gateway requiring specific information varies according to the location of a mobile station. Thus, it is not realistic that the specific information is stored in each gateway. According to this embodiment, as in the flowchart of FIG. 11, the mobile station specific information stored in the call control server can be sent to the gateway. By this, in the communication system of this embodiment, as in FIGS. 12 and 13, the specific information is applied to the mobile station, and the enabled service can be configured. Besides, fine services such as priority call and refused call can be provided.

(B) Call Connection of Press-Talk Call

Next, a description will be given to a flow in which a mobile station sends a press-talk call start request, and a press-talk server receiving it performs call connection to group members of the press-talk. The type of the group member is a mobile station, a base station, and a group address. Here, the group address is for requesting press-talk to another professional wireless system. For example, in FIG. 1, a press-talk call start request can be issued from the press-talk server 106 of the domain netA to the press-talk server 116 of the domain netB.

(B-1) Press-Talk to the Mobile Station

Figure 14A:
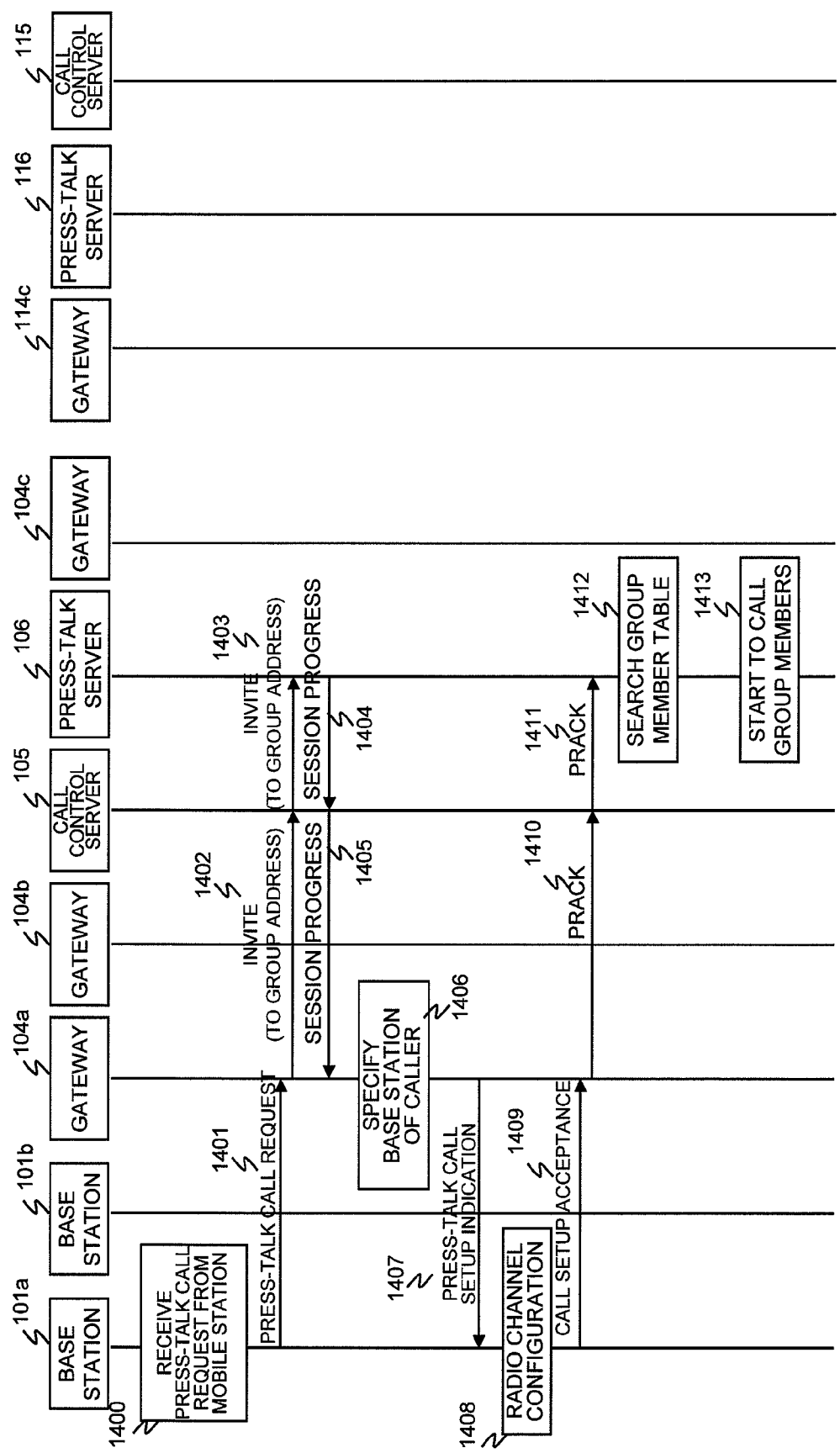
FIG. 14A is a call connection sequence view of press-talk to a mobile station.
Figure 14B:
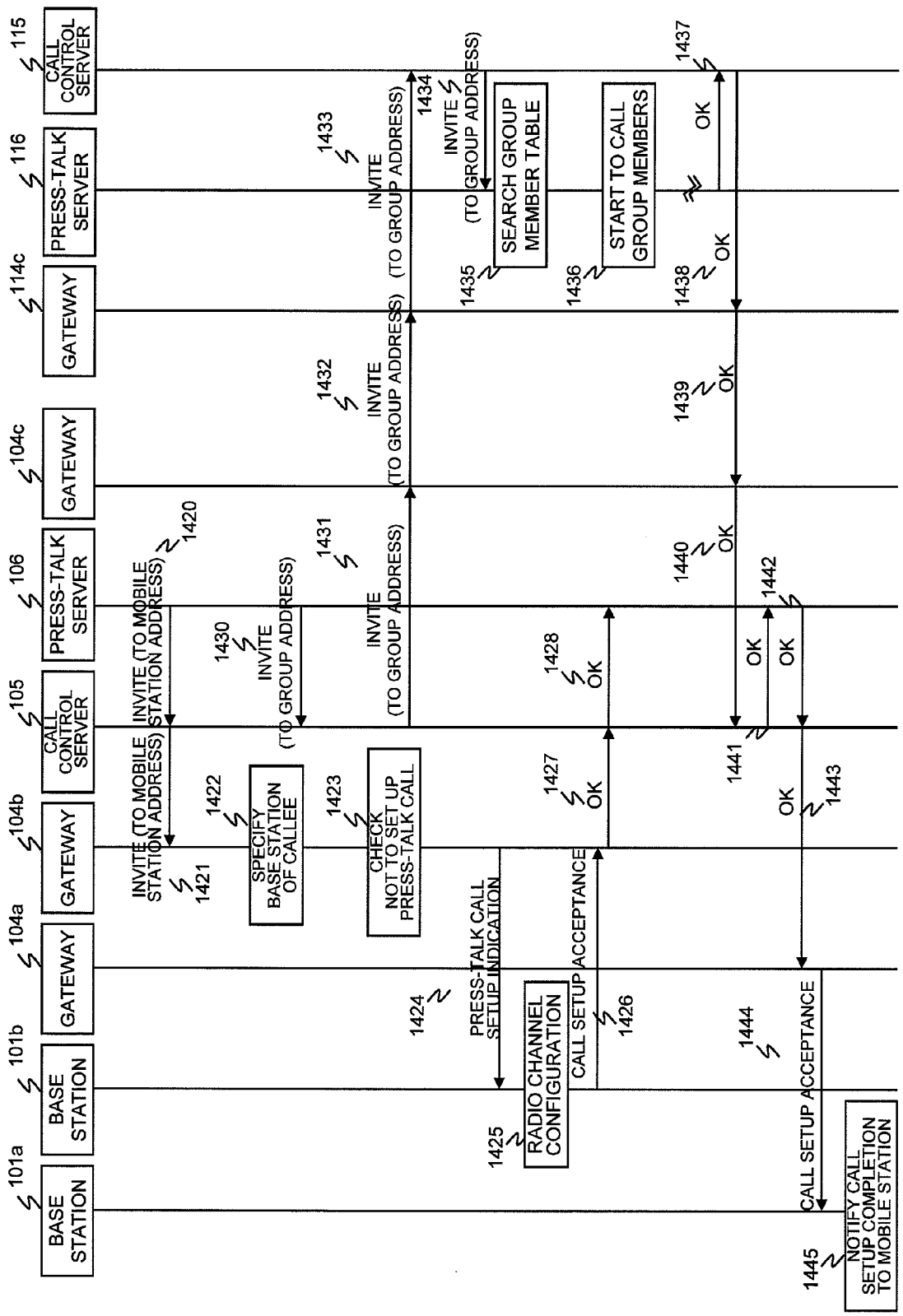
FIG. 14B is a continuation of the call connection sequence view of the press-talk to the mobile station.

FIGS. 14A and 14B are a series of sequence views illustrating call connection of press-talk for a mobile station. Referring to FIG. 14A, the base station 101a receives a press-talk call start request from a mobile station under the base station 101a (step 1400). Thereafter, the base station 101a sends a press-talk call request to the gateway 104a (step 1401). This message includes the mobile station number of the mobile station which issued the start request and the group address as an identifier of the start-requested press-talk. When receiving the press-talk call request, the gateway 104a specifies the proxy module and the forwarding control module for the mobile station which sent the request, and sends INVITE as a call request in the SIP to the call control server 105 (step 1402). A message header of the INVITE includes the mobile station address of the specified proxy module, and the group address as the identifier of the requested press-talk. The call control server transfers the received INVITE to the press-talk server 106 (step 1403). The press-talk server 106 sends Session Progress response as provisional response for the INVITE to the gateway 104a through the call control server 105 (step 1404, 1405). The gateway 104a searches the mobile station location information table 410 of FIG. 7, and specifies the base station 101a where the mobile station having issued the press-talk request exists (step 1406). The gateway 104a sends press-talk call setup indication to the base station 101a in order to perform call connection of press-talk (step 1407). The base station 101a performs radio channel configuration in order to perform press-talk to a mobile station under the base station 101a (step 1408). As described above, the provisional response is regarded as the call connection request, and the protocol conversion is performed, so that the base station where the mobile station having issued the press-talk request exists can also be taken into the press-talk.

Thereafter, the base station 101a sends back call setup acceptance to the gateway 104a (step 1409). The gateway 104a sends, as an acknowledgement to Session Progress response of step 1405, PRACK (PRovisional ACK) to the press-talk server 106 through the call control server 105 (step 1410, 1411). The press-talk server 106 searches the group member table 305 of FIG. 15 by the group address as the identifier of press-talk (step 1412). Thereafter, the press-talk server 106 starts the call connection to the group member included in the entry of the group member table (step 1413).

FIG. 15 shows the group member table 305 of the press-talk server 106. The group member table 305 is previously set and stores a group number 1501 which is an identifier of press-talk and a group member address 1502. This table is previously statically set by the administrator or the like. In this example, it is assumed that the request is made to a group number 0003. The group member address is ms1@netA, ms2@netA and ms3@netA as the mobile station addresses, and 3003@ptserver.netB as the identifier of the group number. Here, 3003@ptserver.netB is the group number managed by a professional wireless system of another network. In this example, it is the identifier of the group number managed by the press-talk server 116 of the domain netB. Incidentally, with respect to a group number 1001, bs2@netA and bs3@netA as the base station addresses and 4001@ptservr-.netB as the identifier of the group number are stored.

When it is previously determined that for example, the address including "ms", "bs" or a numeral represents the mobile station address, the base station address or the group number, the press-talk server 106, 116 can specify the type. Besides, the press-talk server 106 can specify the system or communication network by, for example, the domain name. In addition, a correspondence table of the type, system or communication network and the address or domain name is provided, and the press-talk server 106 may determine the type, system or communication network by referring to this table. As stated above, when the press-talk is delivered also to other professional wireless systems, the group addresses are included in the group member table 305, so that the respective professional wireless systems can independently manage the group members.

Next referring to FIG. 14B, the press-talk server 106 sends INVITE to the gateway 104b through the call control server 105 in order to perform call connection to a member of press-talk (step 1420, 1421). The INVITE includes a group number as an identifier of press-talk and a list of mobile station addresses of plural proxy modules included in the gateway 104b.

FIG. 16 is a view of a message format of INVITE including an address list. A message 1600 includes a type 1601 of a message, a source address 1602, a destination address 1603, and an address list 1604. The press-talk server extracts mobile station addresses which are the members of press-talk and have the same gateway IP address by referring to the location information table 306 of FIG. 34, and creates the address list 1604. In this example, the message format of the SIP is assumed, the message type is INVITE, the From header is 0003@ptserver.netA as the identifier of press-talk, and the To header is ms2@netA of the mobile station address as the destination of call connection. Besides, ms2@netA and ms3@netA are included in the address list of the body part. By creating the INVITE including the address list as stated above, the call connection time of press-talk can be shortened. In general, the INVITE must be sent to the respective group members of press-talk. However, in this embodiment, for mobile stations contained in the same gateway, the call connection can be performed by collectively sending only one INVITE. Besides, voice data flows established by call control of the SIP can be aggregated into one, and the communication resource can be saved.

Referring back to FIG. 14B, when receiving the INVITE, the gateway 104b specifies the forwarding control module and the proxy module for the destination address of the INVITE or each mobile station address included in the address list. Thereafter, the gateway searches the mobile station location information table of FIG. 7 by the mobile station number of the proxy module, and specifies the base station 101b where the mobile station exists (step 1422). The gateway 104b determines whether press-talk call is set up for the base station 101b (step 1423). When the press-talk call is not yet set up, the gateway 104b sends press-talk call setup indication to the base station 101b (step 1424). The protocol conversion procedure of steps 1422, 1423 and 1424 is repeated for all mobile station addresses included in the address list. When receiving the press-talk call setup indication, the base station 101b performs radio channel configuration in order to perform press-talk for a mobile station under the base station 101b (step 1425). Thereafter, the base station 101b sends back call setup acceptance to the gateway 104b (step 1426). The gateway 104b sends OK response for the INVITE of step 1421 to the press-talk server 106 through the call control server 105 (step 1427, 1428). Similarly to the INVITE, this OK response also includes an address list.

FIG. 17 is a message format view of the OK response including the address list. A message 1700 includes a type 1701 of a message, a source address 1702 of an original request message, a destination address 1703 of the original request message, and an address list 1704. The gateway creates a list of the mobile station addresses which the protocol conversion procedure is performed for, and attaches it to the OK response. In this example, the message format of the SIP is assumed, the message type is OK response, the From header is 1003@ptserver.netA as the identifier of press-talk, the To header is mobile station address ms2@netA as the destination of call connection. Besides, ms2@netA and ms3@netA are included in the address list of a body part.

Referring back to FIG. 14B, when the press-talk server 106 determines, based on the address, that an identifier of press-talk of other system is included in the group address of press talk, the press-talk server 106 sends INVITE to the gateway 104c through the call control server 105 (step 1430, 1431). The destination of the INVITE is the group address of press-talk of the other system. The gateway 104c previously includes a forwarding control module for this group address. The gateway 104c transfers the INVITE to the gateway 114c (step 1432). The gateway 114c also previously includes a forwarding control module for this group address. When receiving the INVITE, the gateway 114c sends the INVITE to the press-talk server 116 through the call control server 115 (step 1433, 1434). The press-talk server 116 searches the group member table 305 (FIG. 15) of the press-talk server 116 by the group address as the identifier of press-talk (step 1435). Thereafter, the press-talk server 116 starts the call connection to the group member address included in the entry of the table (step 1436). When the call connection procedure for all group members is completed, the press-talk server 116 sends OK response for the INVITE of step 1434 to the gateway 114c through the call control server 115 (step 1437, 1438). The gateway 114c transfers the OK response to the gateway 104c (step 1439). The gateway 104c sends the OK response for the INVITE of step 1431 to the press-talk server 106 through the call control server 105 (step 1440, 1441). When the call connection procedure for all group members is completed, the press-talk server 106 sends OK response for the INVITE of step 1403 of FIG. 14A to the gateway 104a through the call control server 105 (step 1442, 1443). The gateway 104a sends back the call setup acceptance to the base station 101a (step 1444). The base station 101a notifies call setup completion to the mobile station which sent the press-talk call start request (step 1445).

(B-2) Press-Talk to the Base Station

Figure 18A:
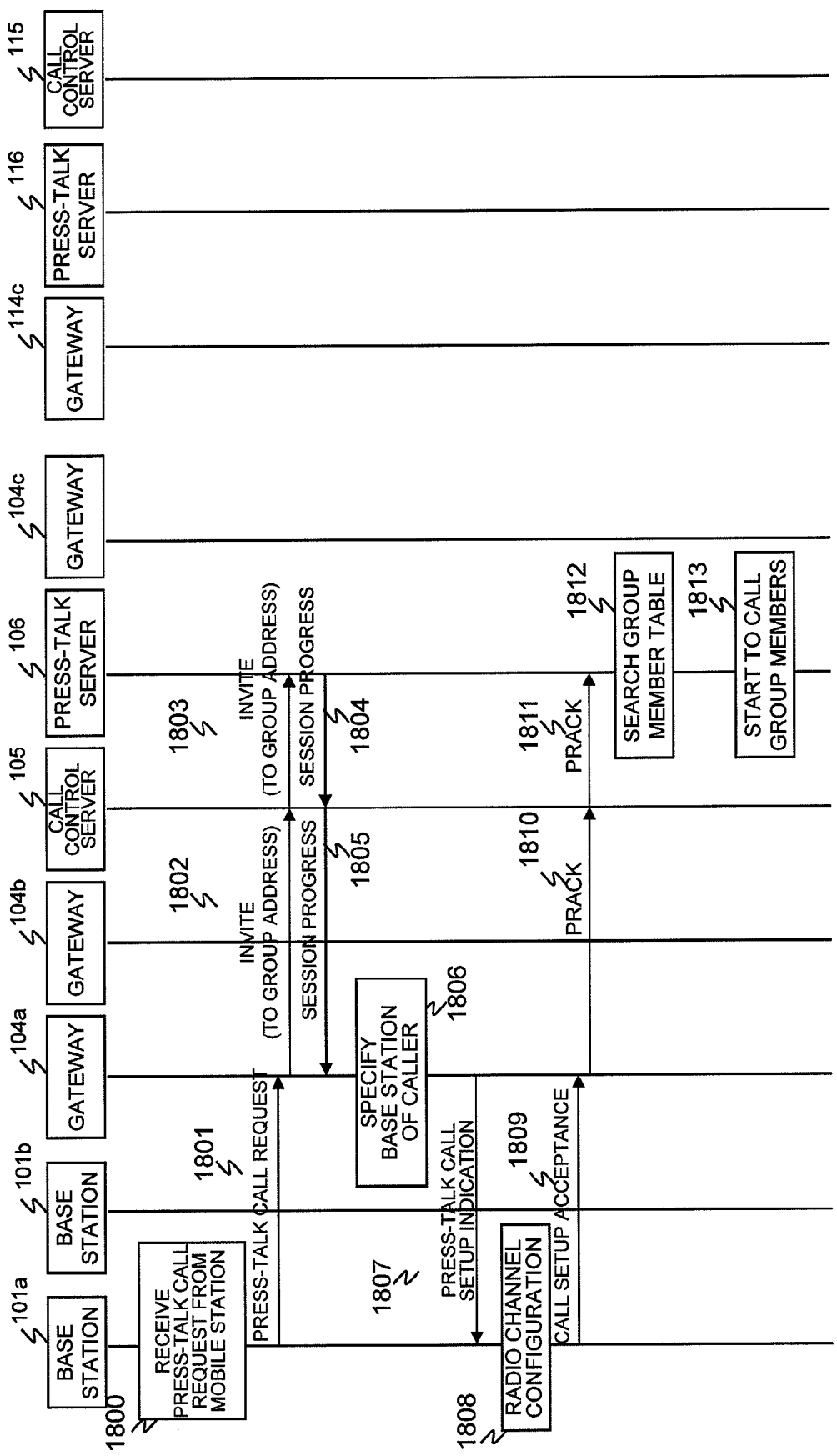
FIG. 18A is a sequence view of call connection of press-talk to a base station.
Figure 18B:
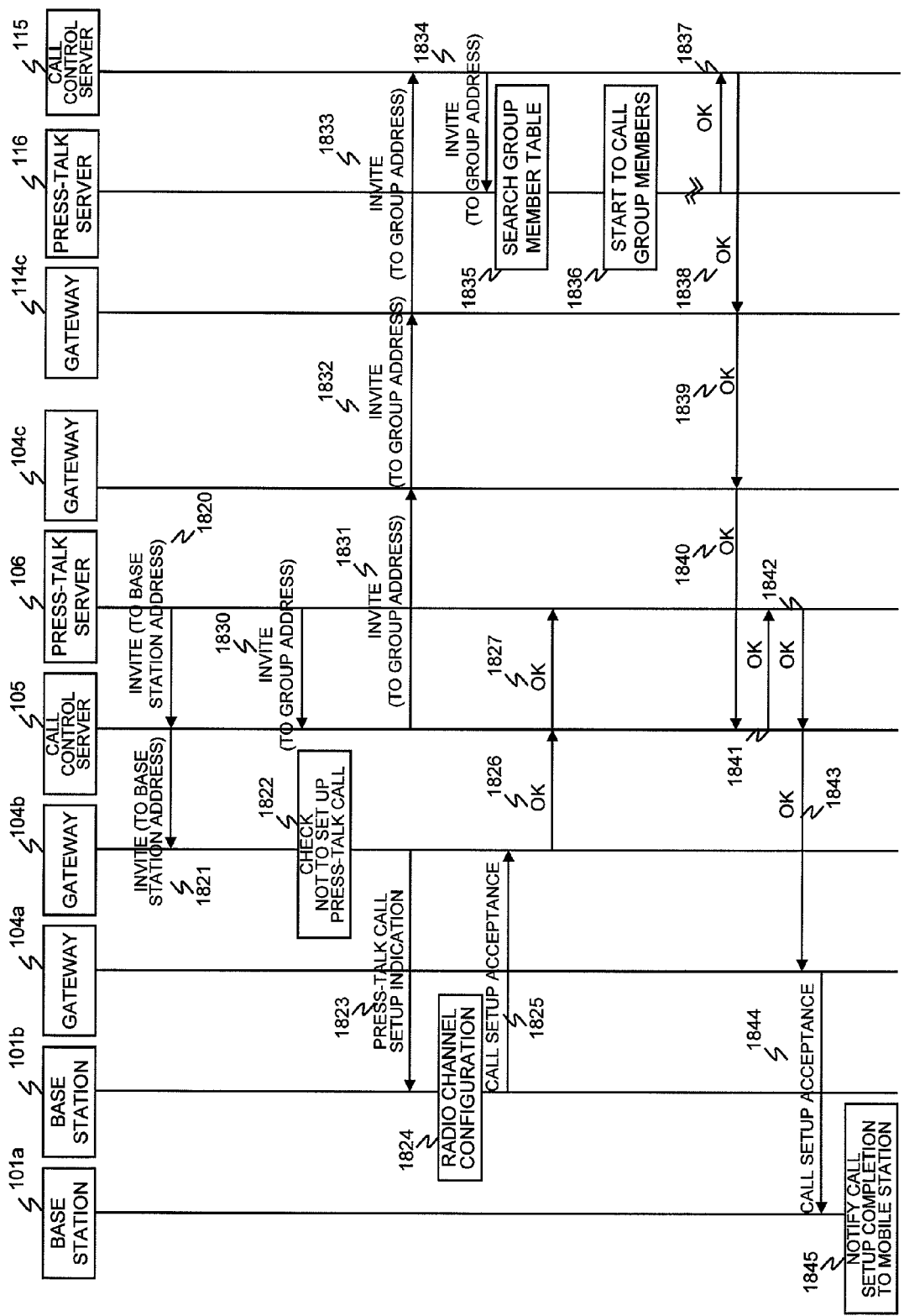
FIG. 18B is a continuation of the sequence view of the call connection of the press-talk to the base station.

FIGS. 18A and 18B are a series of sequence views illustrating call connection of press-talk for a base station. Referring to FIG. 18A, the base station 101a receives a press-talk call start request from a mobile station under the base station 101a (step 1800). Thereafter, the base station 101a sends a press-talk call request to the gateway 104a (step 1801). This message includes the mobile station number of the mobile station having issued the request, and a group number as the identifier of the requested press-talk. When receiving the press-talk call request, the gateway 104a specifies a proxy module and a forwarding control module for the mobile station having sent the request, and sends INVITE as a call request in the SIP to the call control server 105 (step 1802). The message header of the INVITE includes the mobile station address of the specified proxy module and the group address as the identifier of the requested press-talk. The call control server transfers the received INVITE to the press-talk server 106 (step 1803). The press-talk server 106 sends Session Progress response as a provisional response for the INVITE to the gateway 104a through the call control server 105 (step 1804, 1805). The gateway 104a searches the mobile station location information table 410 of FIG. 7, and specifies the base station 101a where the mobile station having issued the press-talk call start request exists (step 1806). The gateway 104a sends press-talk call setup indication to the base station 101a in order to perform call connection of press-talk (step 1807). The base station 101a performs radio channel configuration in order to perform press-talk for a mobile station under the base station 101a (step 1808). Thereafter, the base station 101a sends back call setup acceptance to the gateway 104a (step 1809). The gateway 104a sends, as an acknowledgement to the Session Progress response of step 1805, PRACK to the press-talk server 106 through the call control server 105 (step 1810, 1811). The press-talk server 106 searches the group member table 305 of FIG. 15 by the group address as the identifier of press-talk (step 1812). In this example, it is assumed that the requested group number of the press-talk is 1001. The group member address shown in FIG. 15 is bs2@netA and bs3@netA as the base station addresses, and 4001@ptserver.netB. Here, 4001@ptserver.netB is the group address managed by a professional wireless system of other network. In this example, it is the group address managed by the press-talk server 116 of the domain netB. Referring back to FIG. 18A, thereafter, the press-talk server 116 starts the call connection to the group member address included in the entry of the table (step 1813).

Next referring to FIG. 18B, the press-talk server 106 sends INVITE to the gateway 104b through the call control server 105 in order to perform call connection to the press-talk member (step 1820, 1821). The INVITE includes a group address as an identifier of press-talk and a list of base station addresses of plural proxy modules included in the gateway 104b. The message format of the INVITE is similar to the message 1600 of FIG. 16. The base station addresses of bs2@netA and bs3@netA are included in the address list 1604 of a body part. Referring back to FIG. 18B, when receiving the INVITE, the gateway 104b specifies a forwarding control module and a proxy module for the destination address of the INVITE or each base station address included in the address list. Thereafter, the gateway 104b determines whether press-talk call is not set up for the base station 101b (step 1822). When the press-talk call is not yet set up, the gateway 104b sends the press-talk call setup indication to the base station 101*b* (step 1823). The protocol conversion procedure of steps 1822 and 1823 is repeated for all base station addresses included in the address list. When receiving the press-talk call setup indication, the base station 101*b* performs radio channel configuration in order to deliver the press-talk (step 1824). Thereafter, the base station 101*b* sends back the call setup acceptance to the gateway 104*b* (step 1825). The gateway 104*b* sends OK response for the INVITE of step 1821 to the press-talk server 106 through the call control server 105 (step 1826 1827). Similarly to the INVITE, this OK response also includes the address list. The message format of the OK response is equal to FIG. 17.

Referring back to FIG. 18B, when an identifier of press-talk of other system is included in the group member, the press-talk server 106 sends INVITE to the gateway 104*c* through the call control server 105 (step 1830, 1831). The destination of this INVITE is the group address of press-talk of the other system. The gateway 104*c* previously includes a forwarding control module for this group address. The gateway 104*c* transfers the INVITE to the gateway 114*c* (step 1832). The gateway 114*c* previously includes a forwarding control module for this group address. When receiving the INVITE, the gateway 114*c* sends the INVITE to the press-talk server 116 through the call control server 115 (step 1833, 1834). The press-talk server 116 searches the group member table of the press-talk server 116 by the group address as the identifier of press-talk (step 1835). Thereafter, the press-talk server 116 starts the call connection to the group member address included in the entry of the table (step 1836). When the call connection procedure for all group members is completed, the press-talk server 116 sends OK response for the INVITE of step 1834 to the gateway 114*c* (step 1837, 1838). The gateway 114*c* transfers the OK response to the gateway 104*c* (step 1839). The gateway 104*c* sends the OK response for the INVITE of step 1831 to the press-talk server 106 through the call control server 105 (step 1840, 1841). When the call connection procedure for all group members is completed, the press-talk server 106 sends OK response for the INVITE of step 1803 of FIG. 18A to the gateway 104*a* through the call control server 105 (step 1842, 1843). The gateway 104*a* sends back call setup acceptance to the base station 101*a* (step 1844). The base station 101*a* notifies call setup completion to the mobile station having sent the press-talk call start request (step 1845).

(B-3) Supplement of Comparison of Press-Talk for the Mobile Station and Base Station The above is the flow in which a certain mobile station sends a press-talk call start request and the press-talk server receiving it performs call connection to the mobile station address, the base station address or the group address, which is a group member of press-talk. As will be noted from FIGS. 14A and 14B and FIGS. 18A and 18B, the case where call connection is performed from the press-talk server to the mobile station and the case where call connection is performed to the base station are different only in the protocol conversion procedure in the gateway. Specifically, only a part of steps 1421, 1422, 1423 and 1424 of FIG. 14B and a part of steps 1821, 1822 and 1823 of FIG. 18B are different. Accordingly, in the communication system of this embodiment, irrespective of the destination address of call connection, the interface between the press-talk server, the call control server, and the gateway can be designed in common. When the communication system contains a wireless facility different in radio system and communication protocol, the module to convert the protocol and the module to control the wireless facility have only to be newly added into the gateway.

(B-4) Flowchart

Next, a description will be given to the operation of the press-talk server and the gateway in FIGS. 14A and 14B and FIGS. 18A and 18B.

Figure 19:
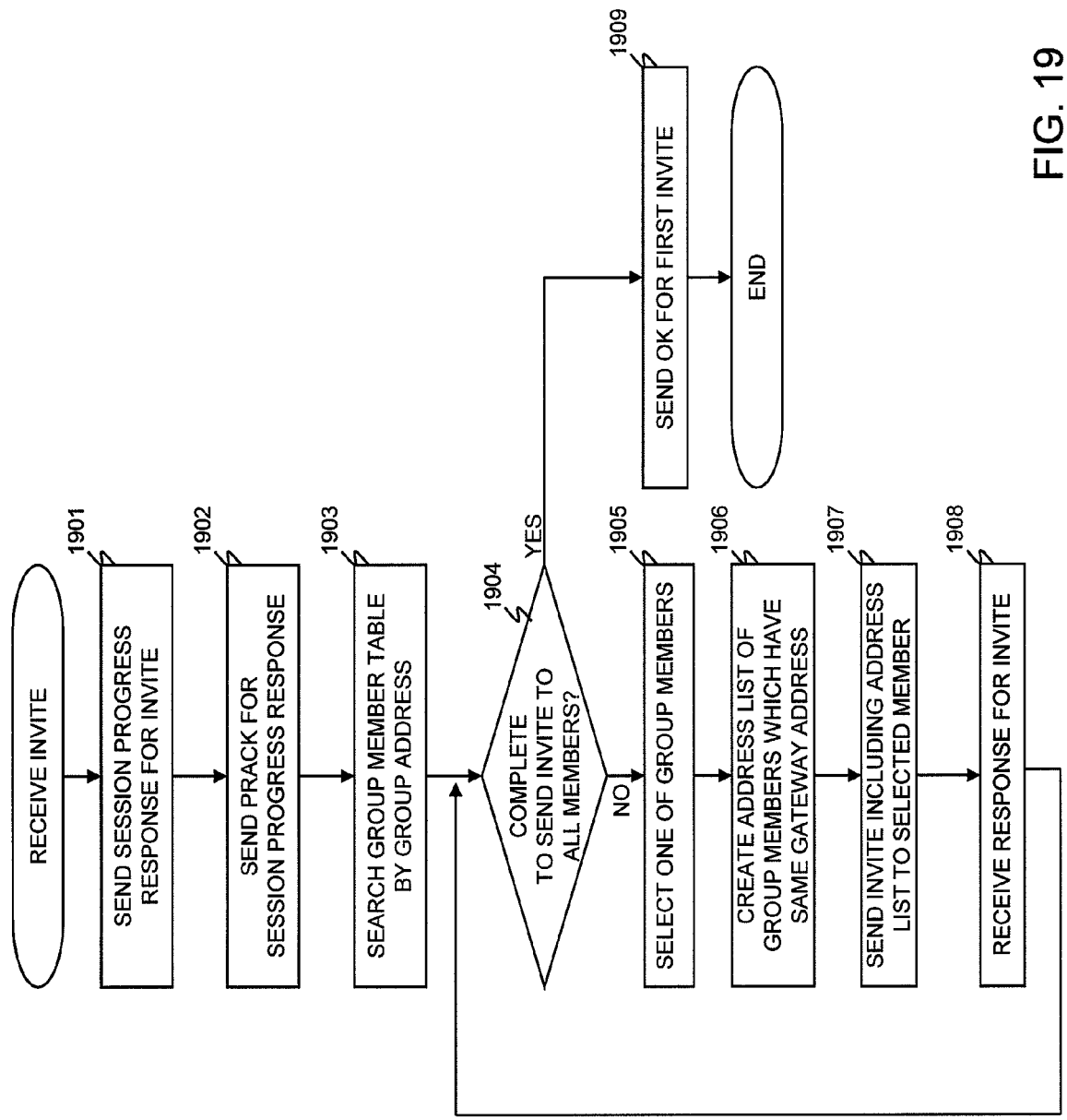
FIG. 19 is a flowchart in which a press-talk server receives INVITE.

FIG. 19 shows a flowchart which starts when the press-talk server 106 receives the INVITE of step 1403 of FIG. 14A or step 1803 of FIG. 18A.

When receiving the INVITE, the press-talk server sends back Session Progress response as a provisional response for the INVITE (step 1901). Thereafter, the press-talk server stands by until receiving PRACK acknowledgement for the Session Progress response (step 1902). The group member table 305 of FIG. 15 is searched by the group address as an identifier of press-talk included in the first received INVITE, and a list of group member addresses is acquired (step 1903). Next, it is checked whether to complete to send the INVITE to all the acquired group member addresses (step 1904). When it is not completed, one address to which the INVITE is not yet sent is selected (step 1905). The press-talk server refers to the contact address information table 306 of FIG. 34 to extract the group member addresses (mobile station address, base station address, or group address) which have the same gateway as the selected address, and creates the address list (step 1906). The press-talk server sends the INVITE including the address list to the address selected at step 1905 (step 1907). The press-talk server stands by until receiving a reply to the INVITE (step 1908). The procedure goes back to step 1904. At this time, it is assumed that the INVITE is already sent to the group member address included in the address list created at step 1906. When to send the INVITE to all group members is completed, the press-talk server sends back the OK response for the INVITE of the trigger of the flowchart, and ends the procedure (step 1909).

Originally, the INVITE must be sent by the number of group members. However, the number of times of sending the INVITE can be reduced by creating and attaching the address list as in the steps 1906 and 1907 of FIG. 19. By this, the call connection time taken before the press-talk call can be shortened. Besides, the communication resource can be saved.

Figure 20:
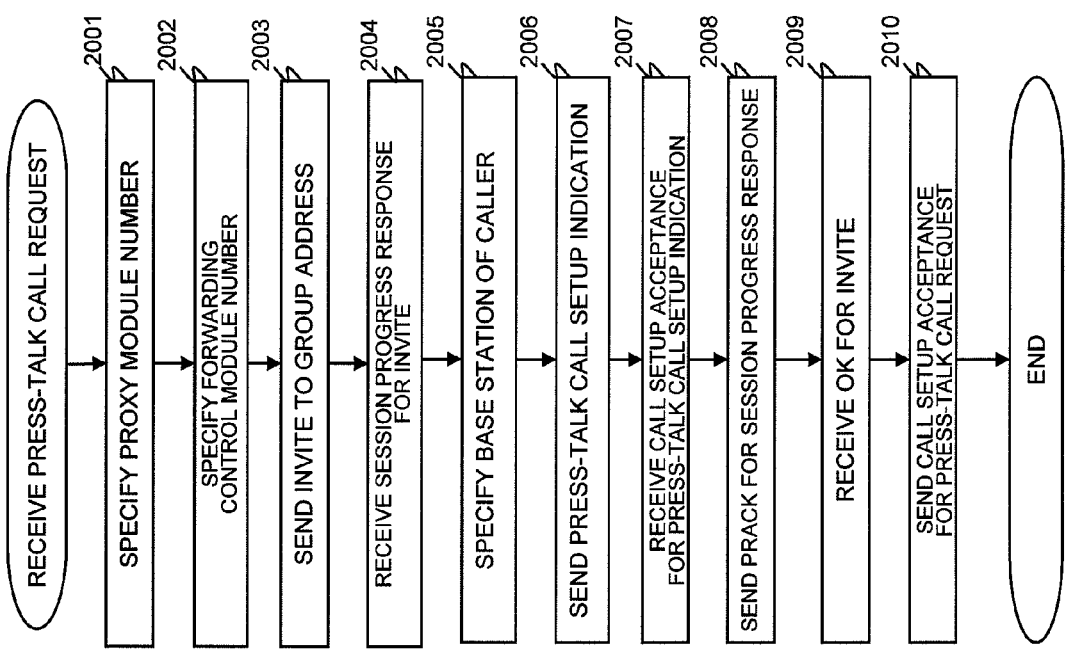
FIG. 20 is a flowchart in which a gateway receives a press-talk call request.

FIG. 20 shows a flowchart which starts when the gateway 104*a* receives the press-talk call request of step 1401 of FIG. 14A or step 1801 of FIG. 18A.

When receiving the press-talk call request, the gateway refers to the proxy module management table 411 of FIG. 8 by the mobile station number included in the message, and specifies the proxy module corresponding to the mobile station having requested the press-talk call (step 2001). Thereafter, the gateway refers to the forwarding control module management table 412 of FIG. 10, and specifies the forwarding control module number corresponding to the mobile station (step 2002). The INVITE is sent from the forwarding control module to the press-talk server while the group address of the requested press-talk is set as the destination address (step 2003). The gateway stands by until receiving Session Progress response as a provisional response for INVITE (step 2004). When receiving the Session Progress response, the gateway refers to the mobile station location information table 410 of FIG. 7 by the mobile station number, and specifies the base station where the mobile station having requested the press-talk call exists (step 2005). The press-talk call setup indication is sent to the base station from the proxy module specified at step 2001 (step 2006). The gateway stands by until receiving the call setup acceptance for the press-talk call setup indication (step 2007). When receiving the call setup acceptance, the gateway sends back PRACK acknowledgement for the Session Progress response received at step 2004 (step 2008). Thereafter, the gateway stands by until receiving OK response for the INVITE sent at step 2003

(step 2009). When receiving the OK response, the gateway sends back call setup acceptance for the press-talk call setup indication of the trigger of the flowchart to the base station, and ends the procedure (step 2010).

By performing the protocol conversion of the steps 2004, 2005 and 2006 of FIG. 20, the call connection of press-talk can be performed more quickly than usual for the base station where the mobile station having made the press-talk call start request exists. By this, call connection time before press-talk call can be shortened.

Figure 21:
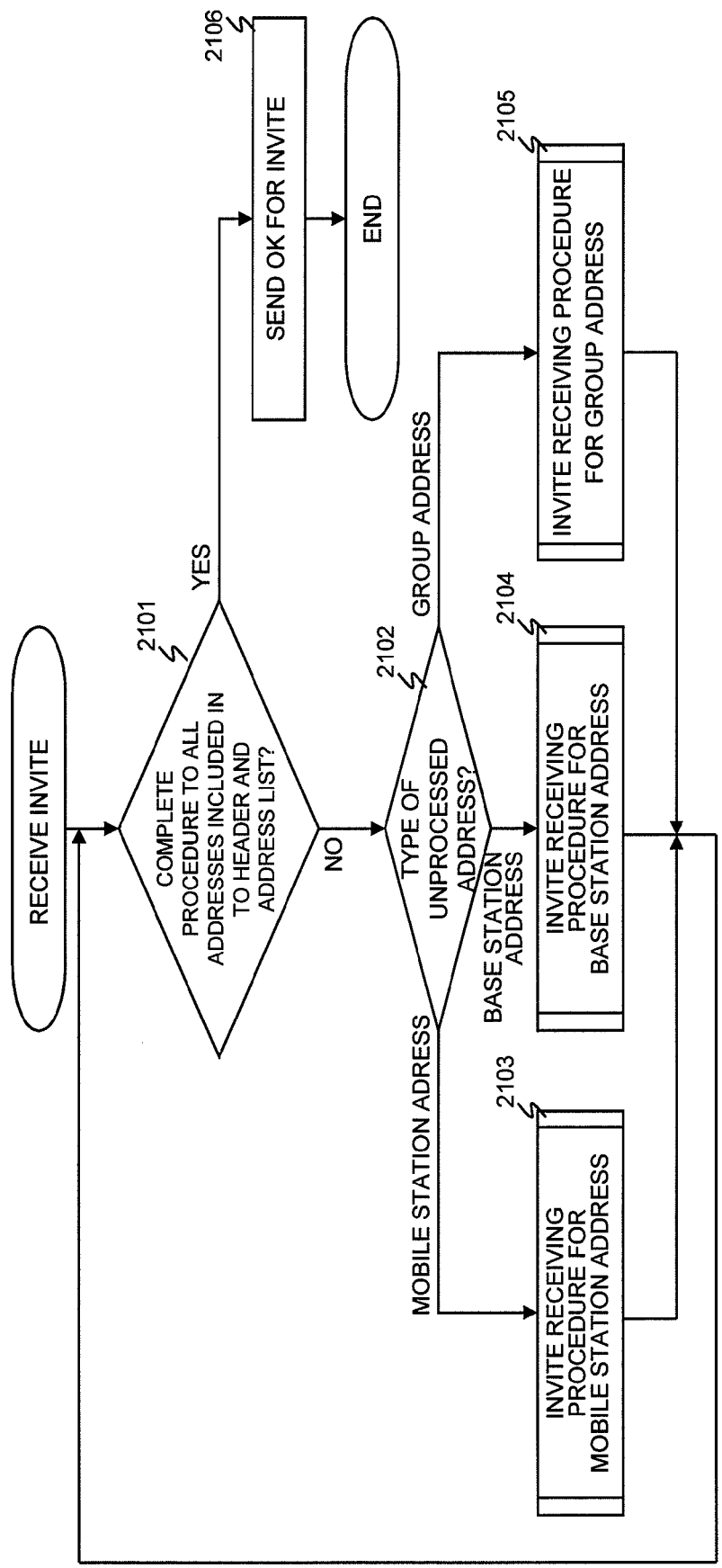
FIG. 21 is a flowchart in which a gateway receives INVITE.

FIG. 21 is a flowchart in which procedures started when the gateways 104a, 104b and 104c receive the INVITE of step 1421, step 1431 or step 1432 of FIG. 14B, or step 1821, step 1831 or step 1832 of FIG. 18B are integrated into one. When receiving the INVITE, the gateway extracts all addresses from the To header and the address list. It is checked whether the protocol conversion procedure is completed for all addresses (step 2101). When the procedure for all addresses is not completed, the gateway selects an address in which the protocol conversion is not yet performed (step 2102). Here, for example, when specific symbols, numerals or the like which respectively denote a mobile station, a base station and a group address are previously determined, or a correspondence table is provided, the gateway can specify that the address is the mobile station address, the base station address or the group address. When the address is the mobile station address, the INVITE receiving procedure for the mobile station address is performed, and then the procedure goes back to step 2101 (step 2103). When the address is the base station address, the INVITE receiving procedure for the base station address is performed, and then the procedure goes back to step 2101 (step 2104). When the address is the group address as the identifier of press-talk, the INVITE receiving procedure for the group address is performed, and then the procedure goes back to step 2101 (step 2105). At step 2101, when the procedure for all addresses is completed, the gateway sends back the OK response for the INVITE of the trigger of the flowchart and ends the procedure (step 2106).

Figure 22:
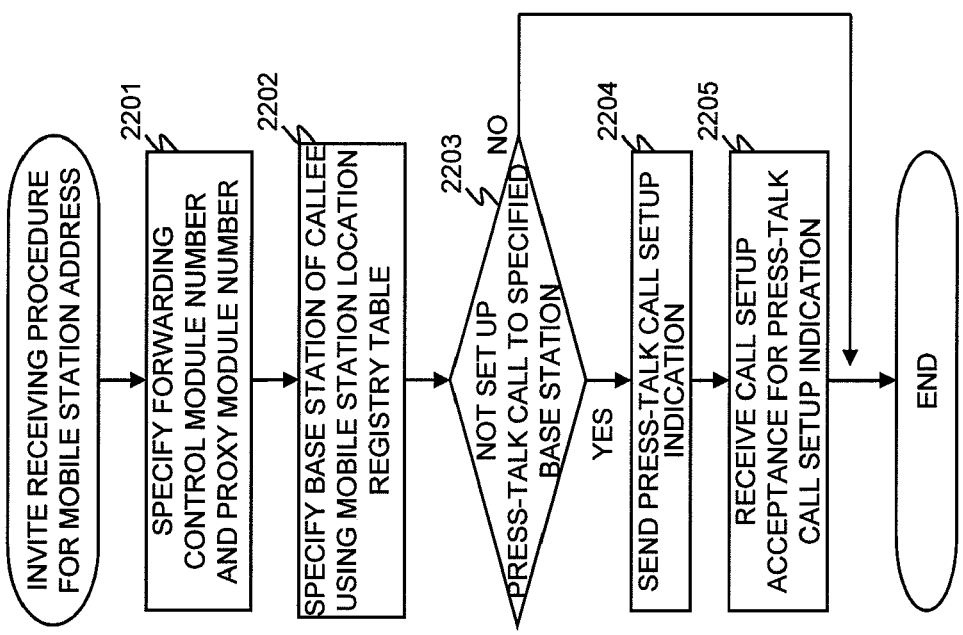
FIG. 22 is a flowchart of an INVITE receiving procedure for a mobile station address.

FIG. 22 is a flowchart showing the details of the INVITE receiving procedure for the mobile station address of step 2103 of FIG. 21. The gateway refers to the forwarding control module management table 412 of FIG. 10 by the mobile station address, and specifies the forwarding control module number and the proxymodule number for the mobile station address (step 2201). The gateway refers to the proxy module management table 411 of FIG. 8 by the proxy module number, and obtains the mobile station number. The gateway refers to the mobile station location information table 410 of FIG. 7 by the mobile station number, and specifies the base station where the mobile station exists (step 2202). The gateway checks whether the press-talk call to the base station is set up, and when the press-talk call is already set up, the procedure is ended (step 2203). When the press-talk call is not set up, press-talk call setup indication is sent from the proxy module to the base station (step 2204). When receiving call setup acceptance as the response for the press-talk call setup indication from the base station, the gateway ends the procedure (step 2205).

Figure 23:
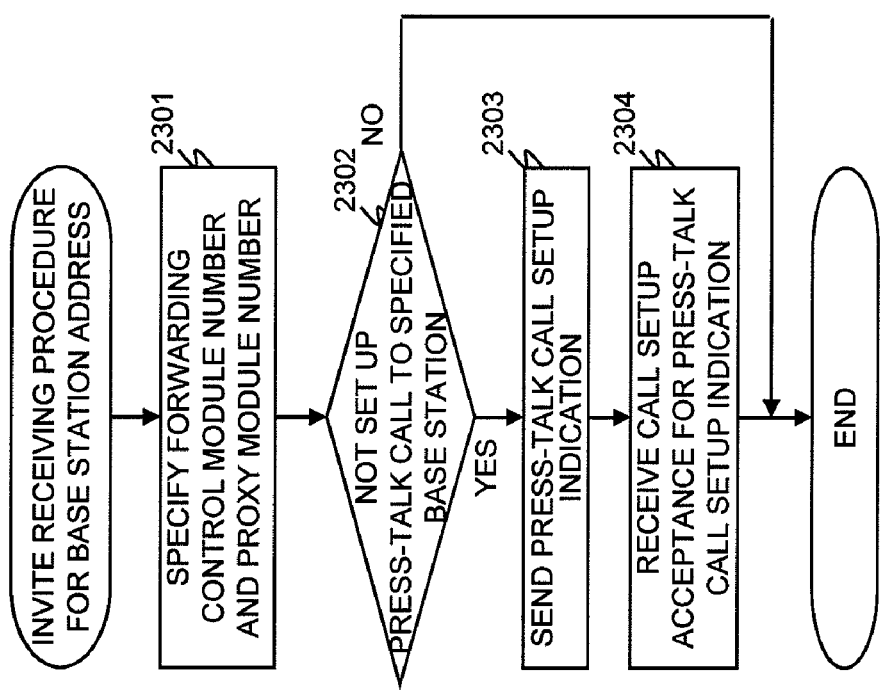
FIG. 23 is a flowchart of an INVITE receiving procedure for a base station address.

FIG. 23 is a flowchart showing the details of the INVITE receiving procedure for the base station address of step 2104 of FIG. 21. The gateway refers to the forwarding control module management table 412 of FIG. 10 by the base station address, and specifies the forwarding control module number and the proxy module number for the base station address (step 2301). The gateway refers to the proxy module table 411 of FIG. 8 by the proxy module number, and obtains the base station number. The gateway checks whether the press-talk call to the base station is set up, and when the press-talk call is already set up, the procedure is ended (step 2302). When the press-talk call is not yet set up, the press-talk call setup indication is sent from the proxy module to the base station (step 2303). When receiving the call setup acceptance as the responses for the press-talk call setup indication from the base station, the gateway ends the procedure (step 2304).

Figure 24:
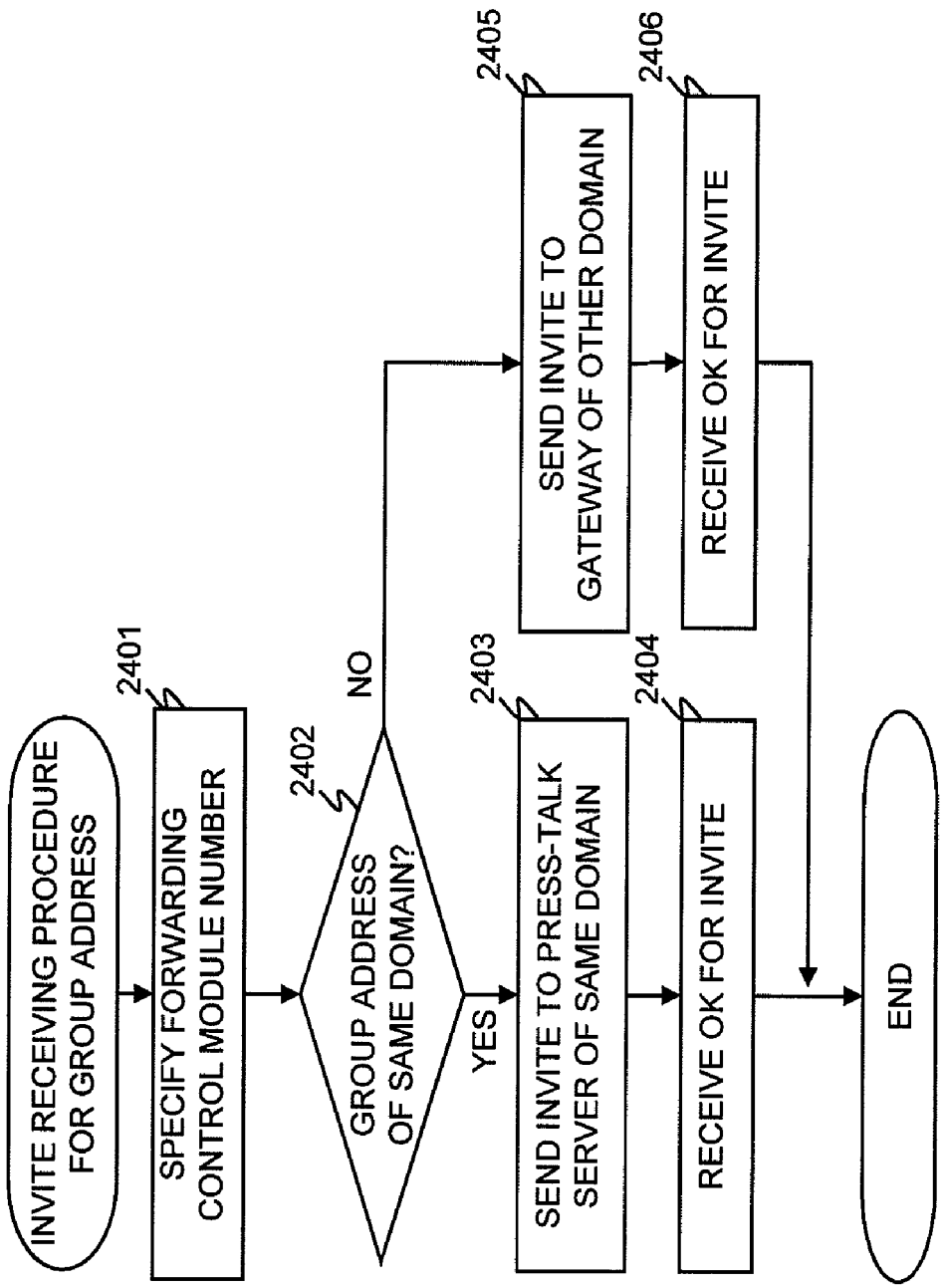
FIG. 24 is a flowchart of an INVITE receiving procedure for a group address.

FIG. 24 is a flowchart showing the details of the INVITE receiving procedure for the group address of step 2105 of FIG. 21. The gateway refers to the forwarding control module management table 412 of FIG. 10 by the group address, and specifies the forwarding control module for the group address (step 2401). The gateway checks the domain name of the group address (step 2402). When the group address is SIP URI, the domain name is attached to the part after at mark. When the domain name indicated by the group address is same as the belonging domain of the gateway, the INVITE is sent to the press-talk server of the same domain (step 2403). The destination of the INVITE is the group address. Thereafter, when receiving OK response for the INVITE from the press-talk server, the gateway ends the procedure (step 2404). At step 2402, when the domain name indicated by the group address is different from the belonging domain of the gateway, the INVITE is transferred to the gateway of the domain indicated by the group address (step 2405). The destination of the INVITE is the group address. Thereafter, when receiving the OK response for the INVITE from the gateway to which the INVITE is transferred, the gateway ends the procedure (step 2406).

In the gateway, as shown in FIG. 21, the INVITE including the address list is processed, so that the INVITE messages from the press-talk server to the gateway are aggregated, and the number of times of sending can be reduced. This results in the saving of communication resource and the shortening of call connection time taken before the press-talk is started.

The gateway includes both the procedures equivalent to the protocol conversions for the mobile station address and the base station address of FIGS. 22 and 23, so that the communication system can be provided which can perform the semi-duplex many-to-many multicasting service for both the mobile station and the base station by using the worldwide standard of call control protocol such as the SIP on the IP network, and can contain mobile stations and base stations of plural existing wireless facilities not supporting the standard call control protocol such as the SIP.

Besides, since the procedure for the group address of FIG. 24 is provided, when press-talk crossing professional wireless systems is performed, the communication resource between the systems can be saved. Further, the respective systems can independently manage the group members of press-talk.

(C) End of Press-Talk

Next, a description will be given to a flow in which a mobile station having made a press-talk call start request sends a press-talk call release request, and a press-talk server receiving it performs call disconnection to group members of press-talk. Similarly to the case of the call connection, the type of a group member is a mobile station, a base station or a group address.

(C-1) Call Disconnection to the Mobile Station

Figure 25A:
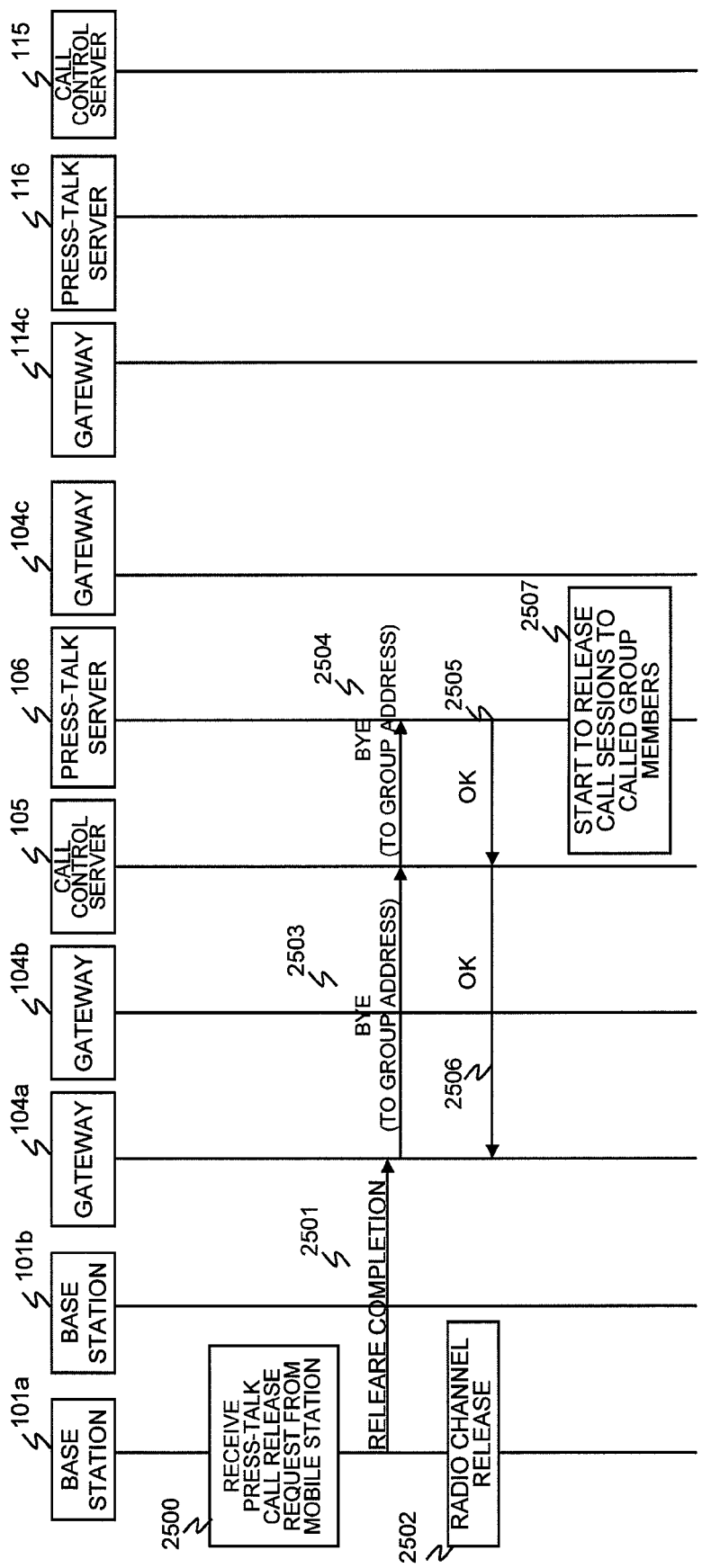
FIG. 25A is a sequence view of call disconnection of press-talk to a mobile station.
Figure 25B:
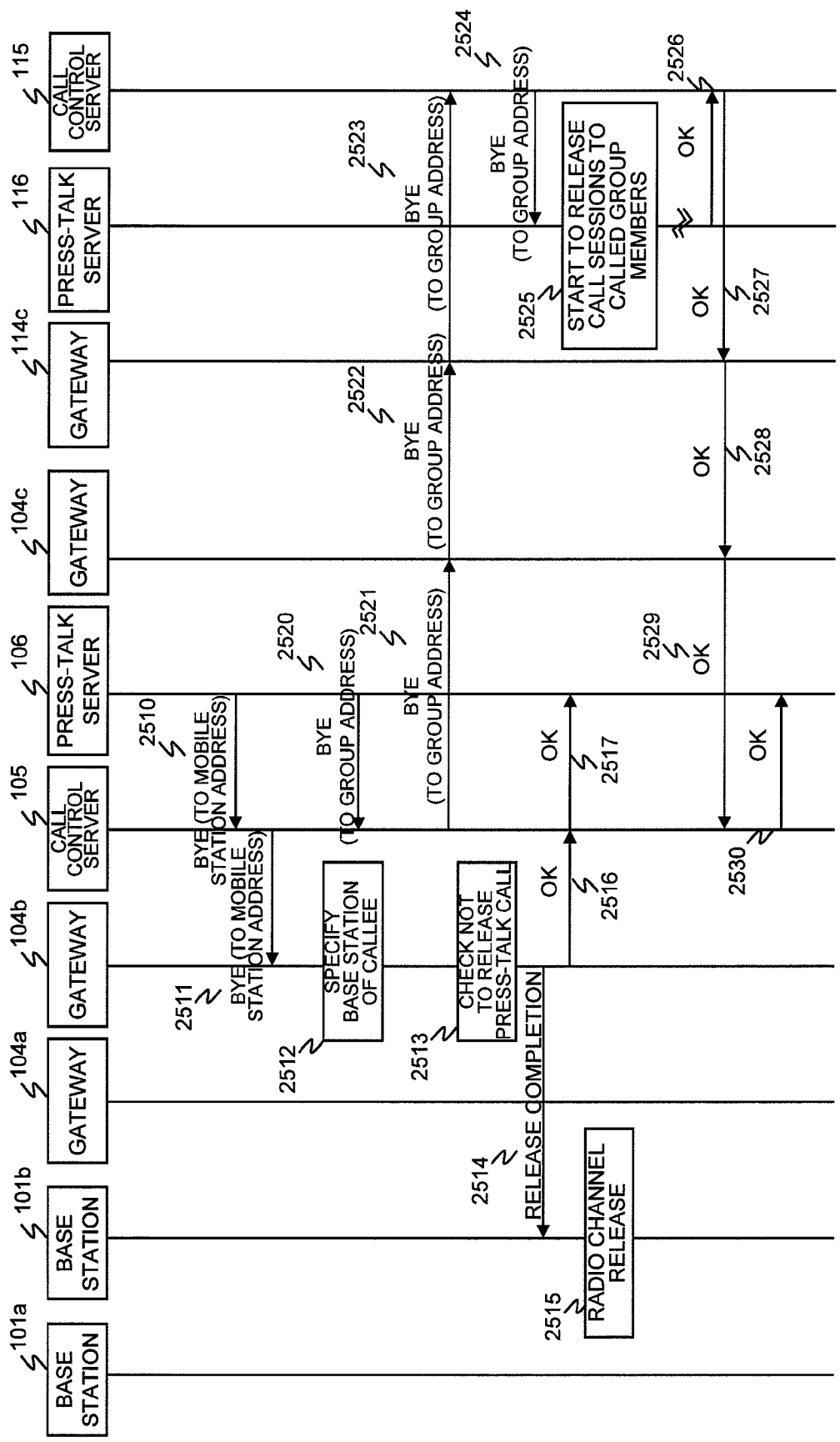
FIG. 25B is a continuation of the sequence view of the call disconnection of the press-talk to the mobile station.

FIGS. 25A and 25B are a series of sequence views in which call disconnection is performed for the mobile station for which press-talk call connection has been performed.

Referring to FIG. 25A, the base station 101a receives a press-talk call release request from a mobile station under the base station 101a (step 2500). The base station 101a sends release completion to the gateway 104a (step 2501). This message includes the mobile station number of the mobile station having issued the release request and the group address as the identifier of the release-requested press-talk. Thereafter, the base station releases a radio channel used for the press-talk (step 2502). When receiving the release completion, the gateway 104*a* specifies the proxy module and the forwarding control module for the mobile station having sent the release request, and deletes the setup information of press-talk call for the base station 101*a*. The gateway 104*a* sends BYE as a call disconnection request in the SIP to the call control server 105 (step 2503). The message header of the BYE includes the mobile station address of the specified proxy module, the release-requested group address. The call control server transfers the received BYE to the press-talk server 106 (step 2504). The press-talk server 106 sends OK response for the BYE to the gateway 104*a* through the call control server 105 (step 2505, 2506). Thereafter, the press-talk server 106 starts the call disconnection to the group member for which the press-talk call connection has been performed (step 2507).

Next referring to FIG. 25B, the press-talk server 106 sends BYE to the gateway 104*b* through the call control server 105 in order to disconnect the call of the group member (step 2510 2511). The BYE includes a group address as an identifier of press-talk and a list of mobile station addresses of plural proxy modules included in the gateway 104*b*.

FIG. 26 is a view of a message format of BYE including an address list. A message 2600 includes a type 2601 of a message, a source address 2602, a destination address 2603 and an address list 2604. The press-talk server extracts mobile station addresses which are members of press-talk and have the same IP address of the gateway by referring to the contact address information table 306 of FIG. 34, and creates the address list 2604. In this example, the message format of the SIP is assumed, the message type is BYE, the From header is 0003@ptserver.netA as an identifier of press-talk, and the To header is ms2@netA of the mobile station address as the address of call disconnection. Besides, ms2@netA and ms3@netA are included in the address list of the body part. By creating the BYE including the address list as stated above, the call disconnection time of press-talk can be shortened.

Referring back to FIG. 25B, when receiving the BYE, the gateway 104*b* specifies the forwarding control module for the destination address of the BYE or each mobile station address included in the address list and the proxy module. Thereafter, the gateway searches the mobile station location information table 410 of FIG. 7 by the mobile station number of the proxy module, and specifies the base station 101*b* where the mobile station exists (step 2512). The gateway 104*b* determines whether the press-talk call for the base station 101*b* is released (step 2513). When the press-talk call is not released, the gateway 104*b* sends release completion to the base station 101*b* (step 2514). The protocol conversion procedure of steps 2512, 2513 and 2514 is repeated for all mobile station addresses included in the address list. When receiving the release completion, the base station 101*b* releases the radio channel in which the press-talk is performed (step 2515). The gateway 104*b* sends OK response for the BYE to the press-talk server 106 through the call control server 105 (step 2516, 2517). Similarly to the BYE, the OK response also includes an address list. The message format of the OK response is similar to FIG. 17.

When the press-talk call connection to the other system has been performed, the press-talk server 106 sends the BYE to the gateway 104*c* through the call control server 105 (step 2520, 2521). The destination of the BYE is the press-talk group address of the other system. The gateway 104*c* previously includes the forwarding control module for the group address. The gateway 104*c* transfers the BYE to the gateway 114*c* (step 2522). The gateway 114*c* also previously includes the forwarding control module for the group address. When receiving the BYE, the gateway 114*c* sends the BYE to the press-talk server 116 through the call control server 115 (step 2523, 2524). The press-talk server 116 starts the call disconnection to the group member for which the press-talk call connection has been performed (step 2525). When the call disconnection procedure for all group members is completed, the press-talk server 116 sends OK response for the BYE of step 2524 to the gateway 114*c* through the call control server 115 (step 2526, 2527). The gateway 104*c* transfers the OK response to the gateway 104*c* (step 2528). The gateway 104*c* sends the OK response for the BYE of step 2521 to the press-talk server 106 through the call control server 105 (step 2529, 2530).

(C-2) Call Disconnection to the Base Station

Figure 27A:
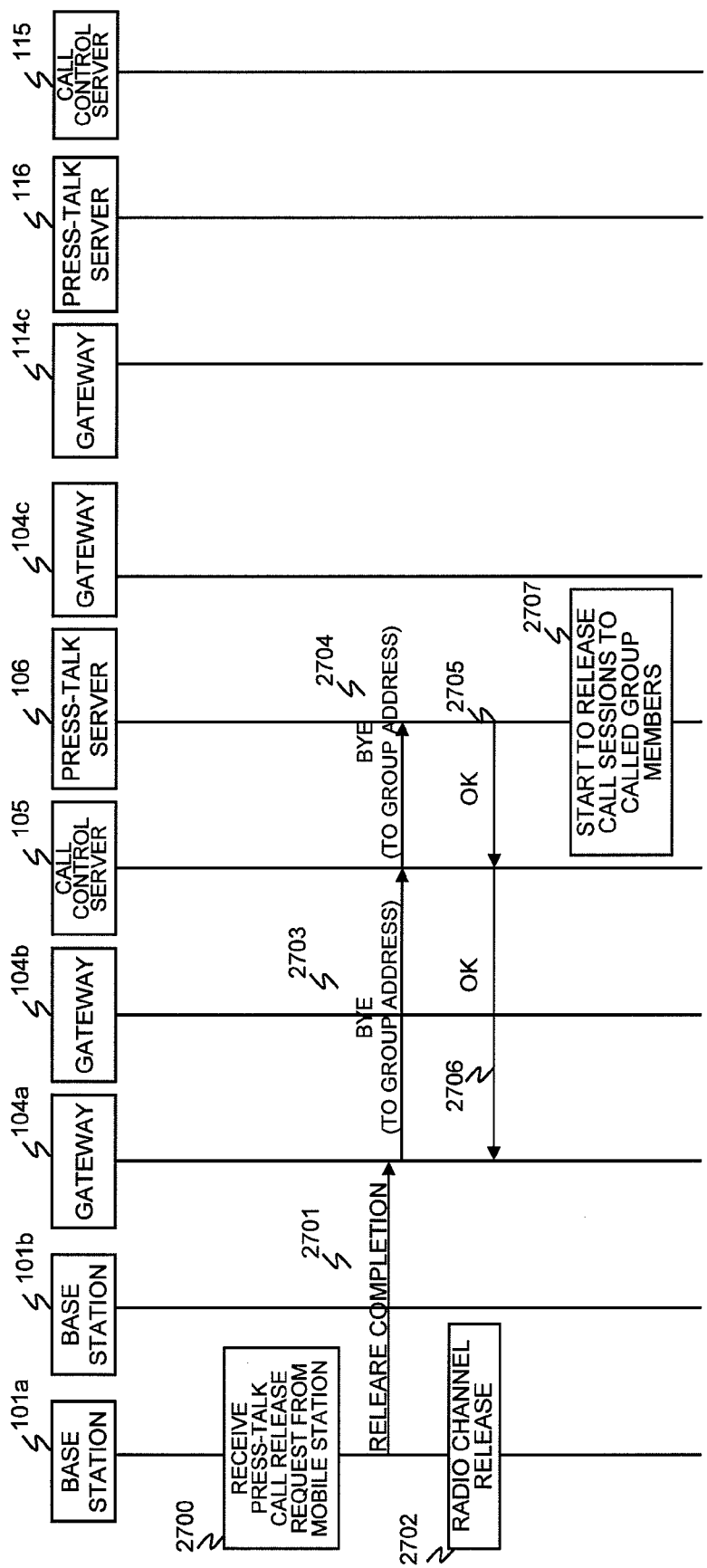
FIG. 27A is a sequence view of call disconnection of press-talk to a base station.
Figure 27B:
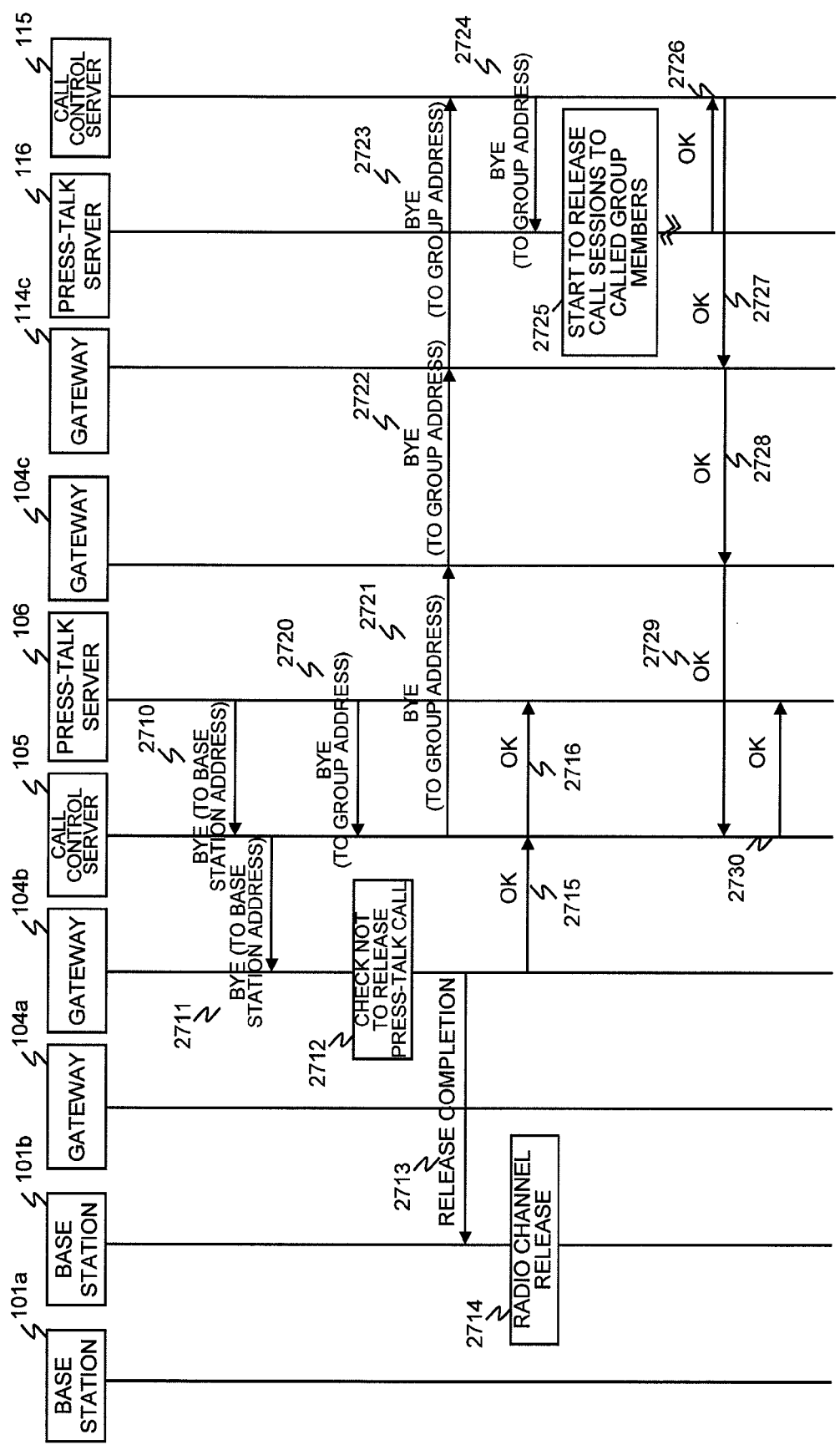
FIG. 27B is a continuation of the sequence view of the call disconnection of the press-talk to the base station.

FIGS. 27A and 27B show a series of sequences in which call disconnection is performed for a press-talk called base station. Referring to FIG. 27A, the base station 101*a* receives a press-talk call release request from a mobile station under the base station 101*a* (step 2700). The base station 101*a* sends release completion to the gateway 104*a* (step 2701). The message includes the mobile station number of the mobile station having issued the release request and the group address as the identifier of the release-requested press-talk. Thereafter, the base station releases the radio channel used for the press-talk (step 2702). When receiving the release completion, the gateway 104*a* specifies the proxy module and the forwarding control module for the mobile station having sent the release request, and delete the setup information of press-talk call for the base station 101*a*. The gateway 104*a* sends BYE as a call disconnection request in the SIP to the call control server 105 (step 2703). The message header of the BYE includes the mobile station address of the specified proxy module and the release-requested group address. The call control server transfers the received BYE to the press-talk server 106 (step 2704). The press-talk server 106 sends OK response for the BYE to the gateway 104*a* through the call control server 105 (step 2705, 2706). Thereafter, the press-talk server 106 starts the call disconnection to the group member for which the press-talk call connection has been performed (step 2707).

Next referring to FIG. 27B, the press-talk server 106 sends BYE to the gateway 104*b* through the call control server 105 in order to disconnect the call of the group member (step 2710, 2711). The BYE includes a group address as an identifier of press-talk and a list of base station addresses of plural proxy modules in the gateway 104*b*. The message format of the BYE is similar to the message 2600 of FIG. 26. The base station addresses of bs2@netA and bs3@netA are included in the address list 2604 of the body part. Referring back to FIG. 27B, when receiving the BYE, the gateway 104*b* specifies the forwarding control module for the destination address of the BYE or each base station address included in the address list and the proxy module. Thereafter, the gateway 104*b* determines whether the press-talk call of press-talk for the base station 101*b* is released (step 2712). When the press-talk call is not released, the gateway 104*b* sends release completion to the base station 101*b* (step 2713). The protocol conversion procedure of steps 2712 and 2513 is repeated for all base station addresses included in the address list. When receiving the release completion, the base station 101*b* releases the radio channel in which the press-talk is performed (step 2714). The gateway 104*b* sends OK response for the BYE to the press-talk server 106 through the call control server 105 (step 2715, 2716). Similarly to the BYE, this OK response also includes the address list. The message format of the OK response is similar to FIG. 17. When the press-talk call connection is performed for the other system, the press-talk server 106 sends the BYE to the gateway 104*c* through the call control server 105 (step 2720, 2721). The destination of the BYE is the group address of the press-talk of the other system. The gateway 104*c* previously includes the forwarding control module for this group address. The gateway 104*c* transfers the BYE to the gateway 114*c* (step 2722). The gateway 114*c* also includes the forwarding control module for this group address. When receiving the BYE, the gateway 114*c* sends the BYE to the press-talk server 116 through the call control server 115 (step 2723, 2724). The press-talk server 116 starts the call disconnection to the group member for which the press-talk call connection has been performed (step 2725). When the call disconnection procedure for all group members is completed, the press-talk server 116 sends OK response for the BYE of step 2724 to the gateway 114*c* through the call control server 115 (step 2726, 2727). The gateway 114*c* transfers the OK response to the gateway 104*c* (step 2728). The gateway 104*c* sends the OK responses for the BYE of step 2721 to the press-talk server 106 through the call control server 105 (step 2729, 2730).

(C-3) Supplement of Comparison of Press-Talk to the Mobile Station and the Base Station The above is the flow in which the mobile station having made the press-talk call start request sends the release request, and the press-talk server having received it performs the call disconnection to the mobile station address, the base station address or the group address, which is the group member for which the call connection is established. As will be noted from FIGS. 25A and 25B and FIGS. 27A and 27B, the case where the call disconnection is performed from the press-talk server to the mobile station and the case where the call disconnection is performed to the base station are different only in the protocol conversion procedure in the gateway. Specifically, only a part of steps 2511, 2512, 2513 and 2514 of FIG. 25B and a part of steps 2711, 2712 and 2713 of FIG. 27B are different. Accordingly, in the communication system of this embodiment, similarly to the case of the press-talk call connection, irrespective of the destination address of call disconnection, the interface between the press-talk server, the call control server and the gateway can be designed in common. When a wireless facility different in radio system and communication protocol is contained in the communication system, the module to convert the protocol and the module to control the wireless facility have only to be newly added into the gateway.

(C-4) Flowchart

Next, a description will be given to the operation of the press-talk server and the gateway in FIGS. 25A and 25B and FIGS. 27A and 27B.

Figure 28:
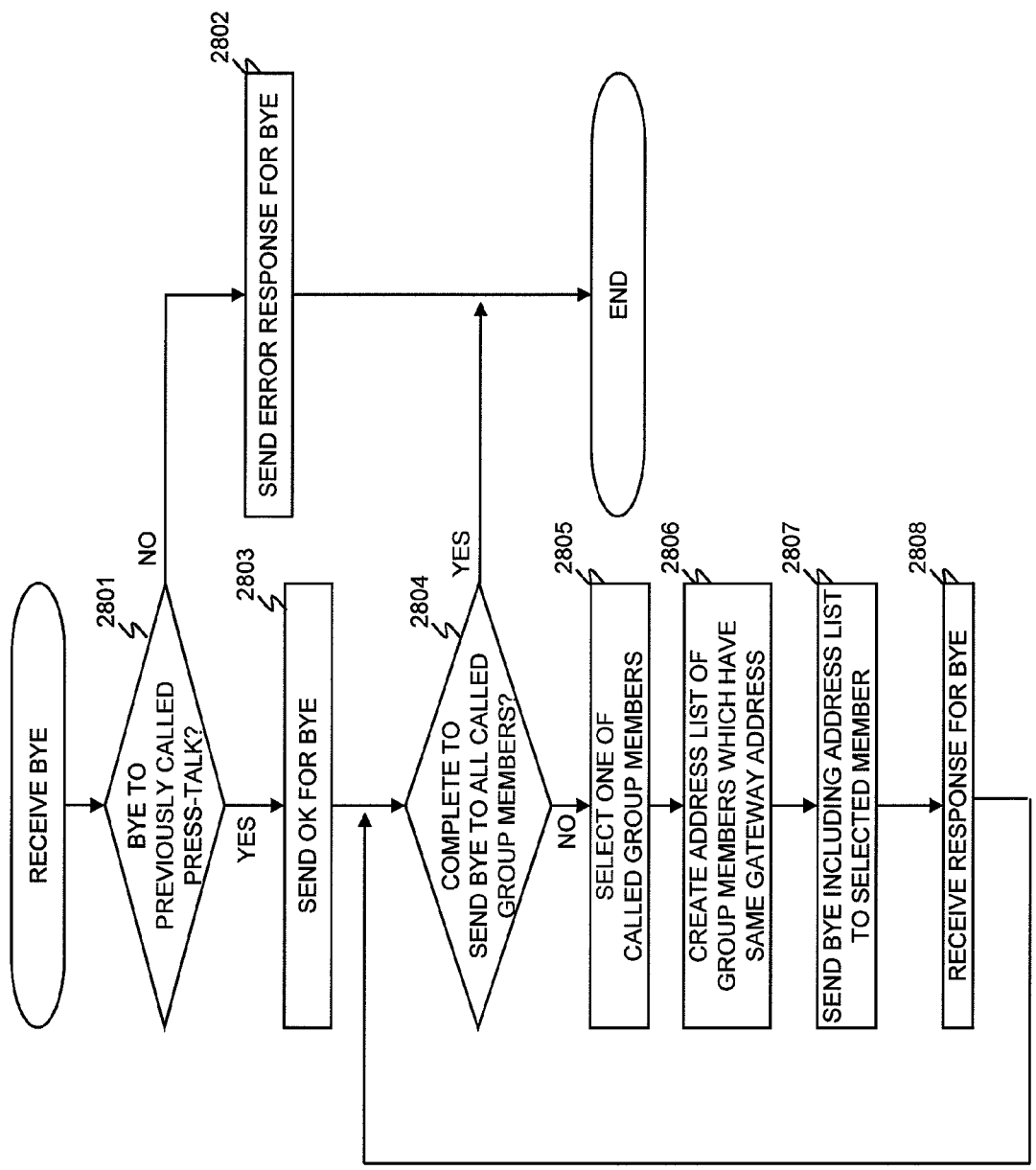
FIG. 28 is a flowchart in which a press-talk server receives BYE.

FIG. 28 is a flowchart which starts when the BYE of step 2504 of FIG. 25A or step 2704 of FIG. 27A is received.

When receiving the BYE, the press-talk server checks whether the BYE is for the previously called press-talk (step 2801). When the BYE is not for the previously called press-talk, an error response for the BYE is sent back, and the procedure is ended (step 2802). At step 2801, when the BYE is for the previously called press-talk, the OK response for the BYE which is the trigger of the flowchart is sent back (step 2803). Next, it is checked whether to complete to send the BYE to all called group member addresses (step 2804). When it is not completed, one of the addresses to which the BYE is not yet sent is selected (step 2805). The press-talk server refers to the contact address information table 306 of FIG. 34 to extract the group member addresses (mobile station address, base station address, or group address) which have the same gateway as the selected address, and creates an address list (step 2806). The press-talk server sends the BYE including the address list to the address selected at step 2805 (step 2807). The press-talk server stands by until receiving a response for the BYE (step 2808). The procedure goes back to step 2805 again. At this time, it is regarded that the BYE is already sent to the group member address included in the address list created at step 2806. When to send the BYE to all called group members is completed, the procedure is ended.

Similarly to the INVITE, as in steps 2806 and 2807 of FIG. 28, the number of times of sending the BYE can be reduced by creating and attaching the address list. By this, call disconnection time taken before the press-talk is ended can be shortened. Besides, the communication resource can be saved.

Figure 29:
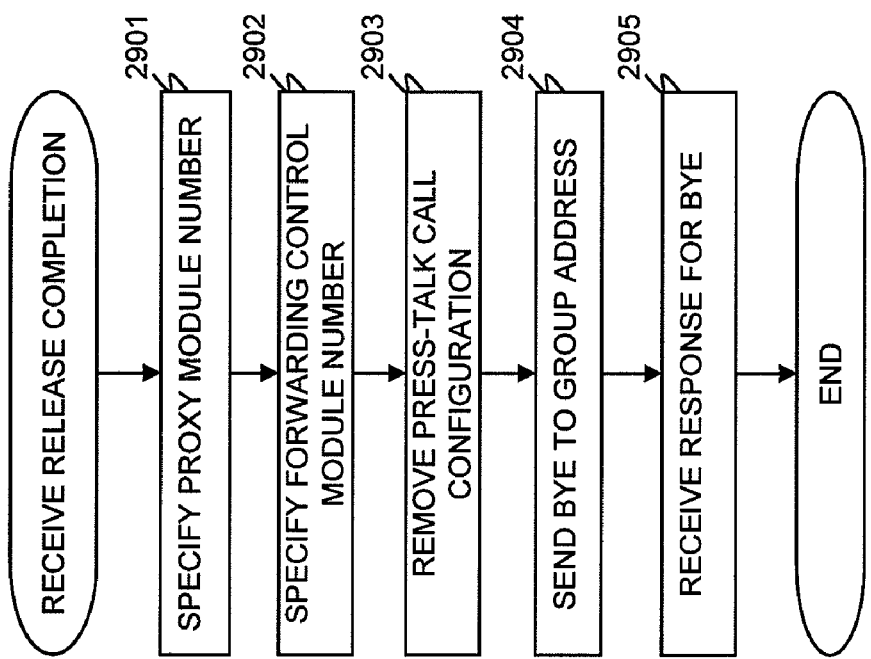
FIG. 29 is a flowchart in which a gateway receives release completion.

FIG. 29 is a flowchart which starts when the gateway 104*a* receives the release completion of step 2501 of FIG. 25A or step 2701 of FIG. 27A. When receiving the release completion, the gateway refers to the proxy module management table 411 of FIG. 8 by the mobile station number included in the message, and specifies the proxy module corresponding to the mobile station having made the press-talk call start request (step 2901). Thereafter, the gateway refers to the forwarding control module management table 412 of FIG. 10, and specifies the forwarding control module number corresponding to the mobile station (step 2902). The gateway removes press-talk call configuration for the base station from the proxy module (step 2903). At this time, in this example, it is assumed that the base station sending the release completion already releases the radio channel for the press-talk call. Thereafter, the BYE is sent from the forwarding control module to the press-talk server while the group address of the release-requested press-talk is set as a destination address (step 2904). The gateway stands by until receiving the OK response for the BYE sent at step 2904 and ends the procedure (step 2905)

Figure 30:
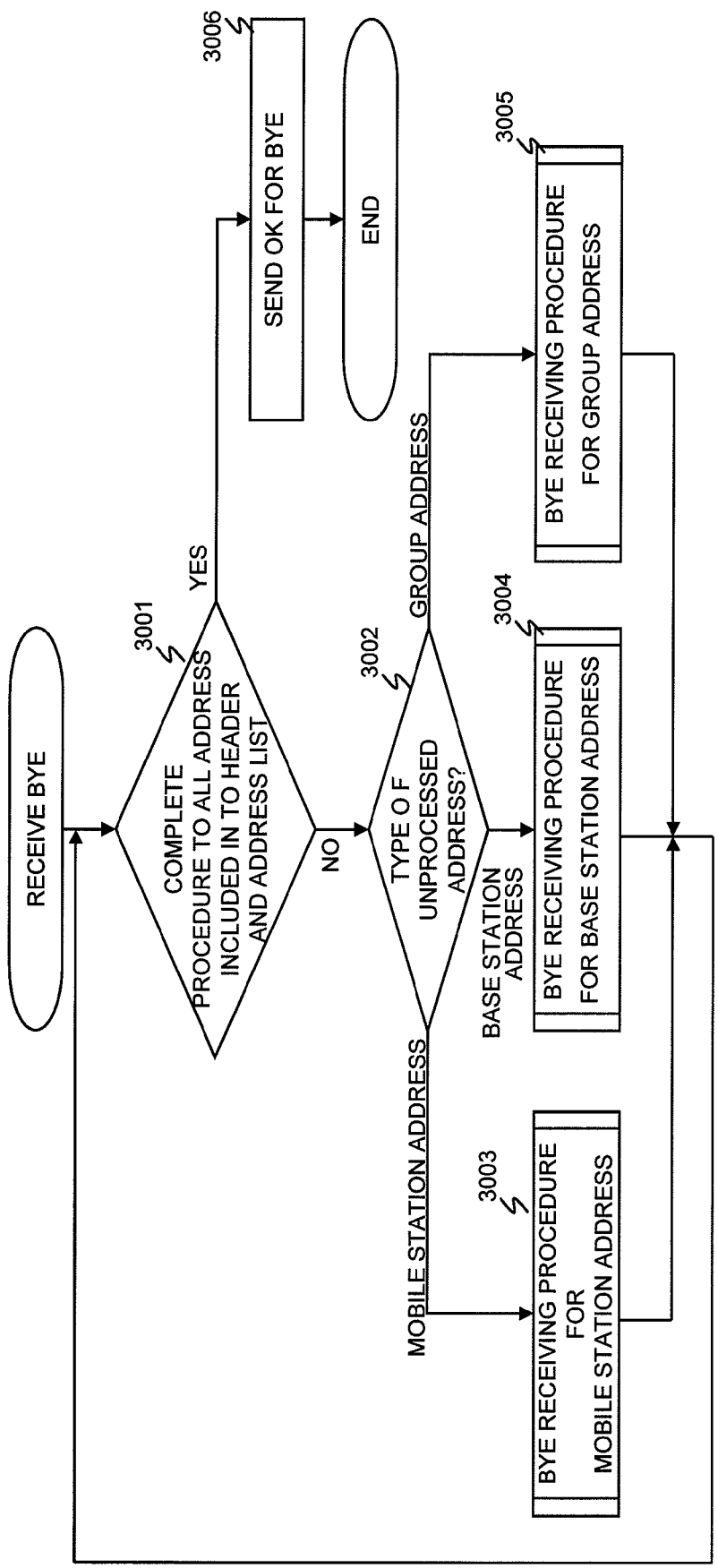
FIG. 30 is a flowchart in which a gateway receives BYE.

FIG. 30 is a flowchart in which procedures started when the gateways 104*a*, 104*b* and 104*c* receive the BYE of step 2511 step 2521 or step 2522 of FIG. 25B or step 2711, step 2721 or step 2722 of FIG. 27B are aggregated into one. When receiving the BYE, the gateway extracts all addresses from the To header and the address list. It is checked whether the protocol conversion procedure is completed for all addresses (step 3001). When the procedure for all addresses is not completed, the gateway selects an address in which the protocol conversion is not yet performed (step 3002). When the address is the mobile station address, the BYE receiving procedure for the mobile station address is performed, and return is made to step 3001 (step 3003). When the address is the base station address, the BYE receiving procedure for the base station address is performed, and then the procedure goes back to step 3001 (step 3004). When the address is the group address as the identifier of press-talk, the BYE receiving procedure for the group address is performed and then the procedure goes back to step 3001 (step 3005). At step 3001, when the procedure for all addresses is completed, the gateway sends back the OK response for the BYE of the trigger of the flowchart and ends the procedure (step 3006).

Figure 31:
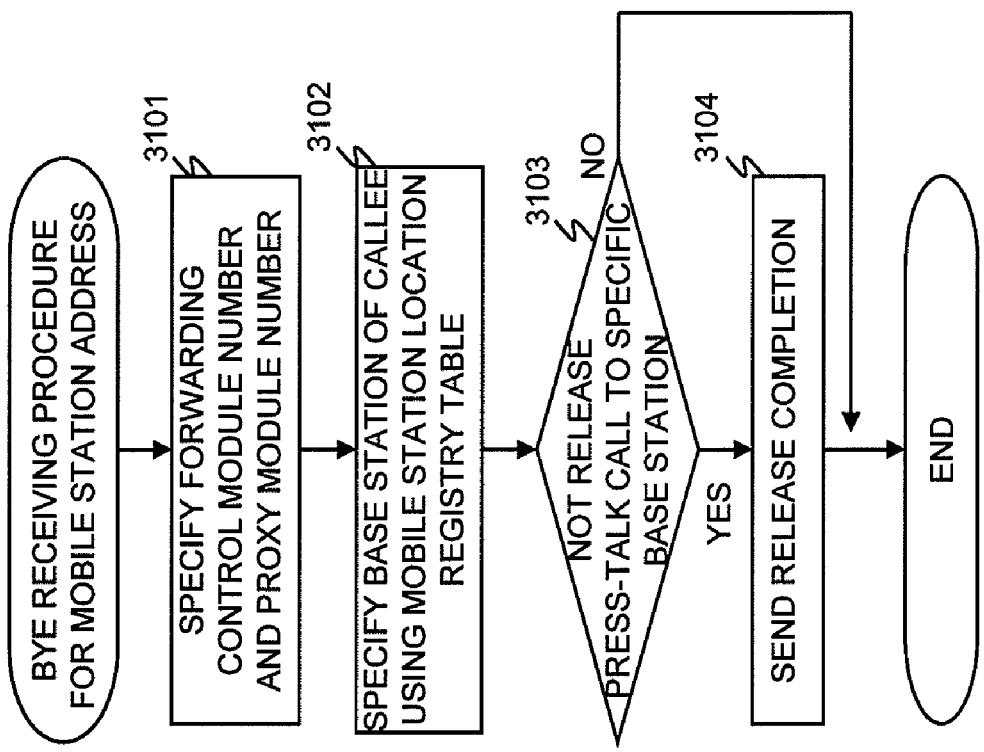
FIG. 31 is a flowchart of a BYE receiving procedure for a mobile station address.

FIG. 31 is a flowchart showing the details of the BYE receiving procedure for the mobile station address of step 3003 of FIG. 30. The gateway refers to the forwarding control module management table 412 of FIG. 10 by the mobile station address, and specifies the forwarding control module number and the proxy module number for the mobile station address (step 3101). The gateway refers to the proxy module management table 411 of FIG. 8 by the proxy module number, and obtains the mobile station number. The gateway refers to the mobile station location information table 410 of FIG. 7 by the mobile station number, and specifies the base station where the mobile station exists (step 3102). The gateway checks whether the press-talk call setup indication for the base station is released, and when the press-talk call is already released, the procedure is ended (step 3103). When the press-talk call is not released, the gateway removes the press-talk call setup information for the base station from the proxy module. Thereafter, the release completion is sent from the proxy module to the base station, and the procedure is ended (step 3104).

Figure 32:
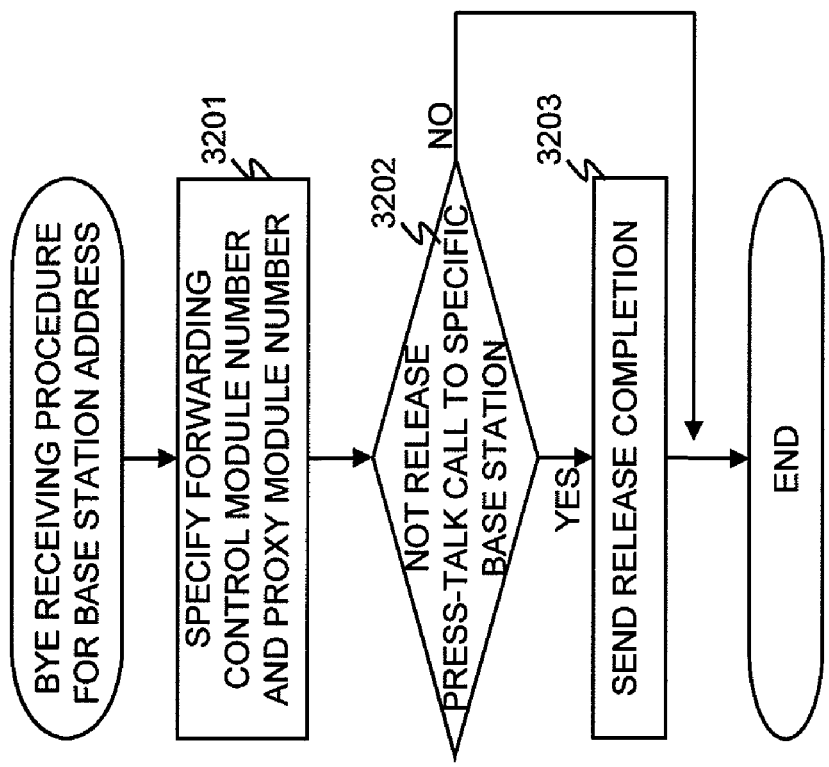
FIG. 32 is a flowchart of a BYE receiving procedure for a base station address.

FIG. 32 is a flowchart showing the details of the BYE receiving procedure for the base station address of step 3004 of FIG. 30. The gateway refers to the forwarding control module management table 412 of FIG. 10 by the base station address, and specifies the forwarding control module number and the proxy module number for the base station address (step 3201). The gateway refers to the proxy module management table 411 of FIG. 8 by the proxy module number, and obtains the base station number. It is checked whether the press-talk call setup indication for the base station is released, and when the press-talk call is already released, the procedure is ended (step 3202). When the press-talk call is not yet released, the gateway removes the press-talk call setup information for the base station from the proxy module. Thereafter, release completion is sent from the proxy module to the base station, and the procedure is ended (step 3203).

Figure 33:
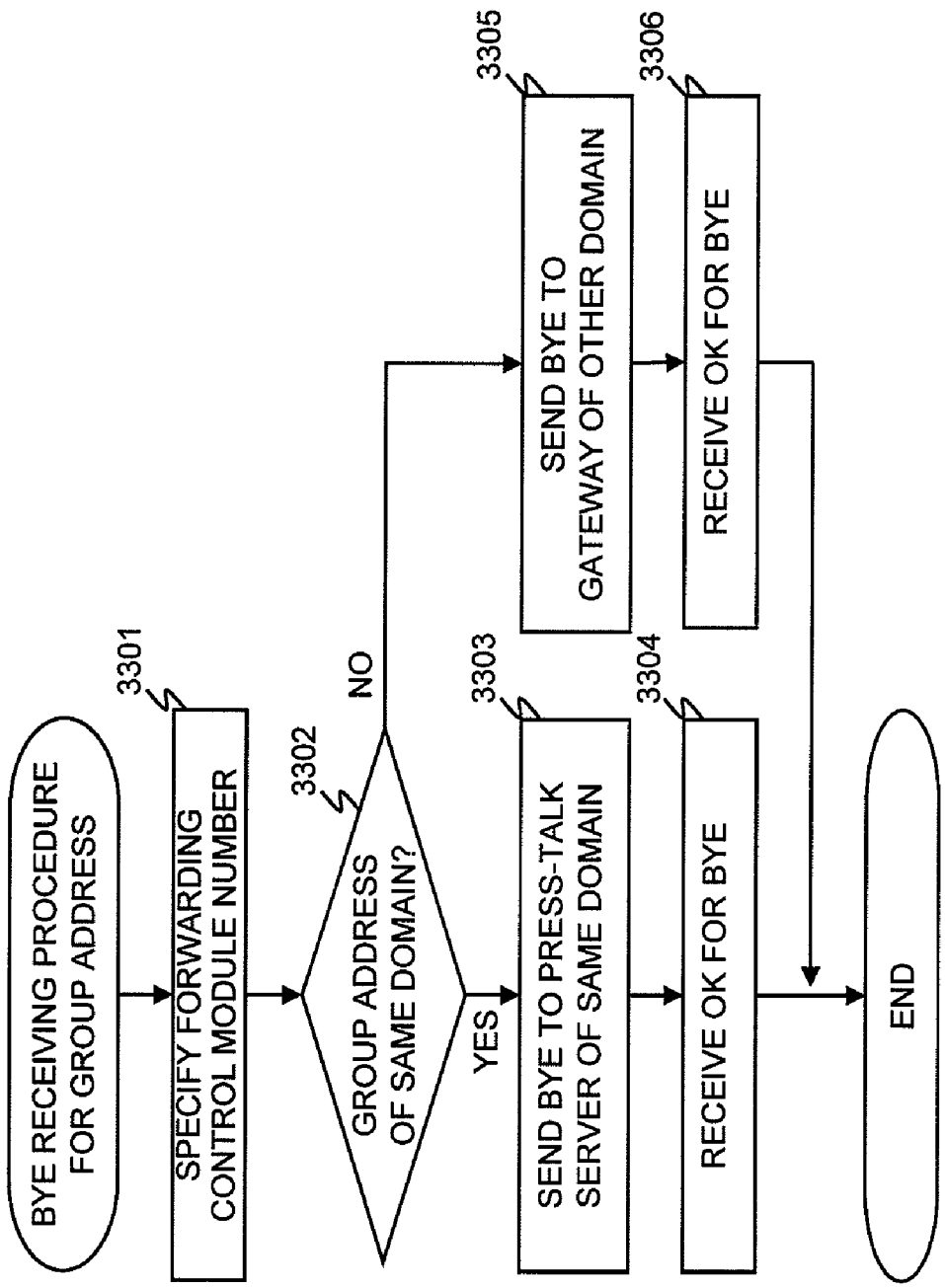
FIG. 33 is a flowchart of a BYE receiving procedure for a group address.

FIG. 33 is a flowchart showing the details of the BYE receiving procedure for the group address of step 3005 of FIG. 30. The gateway refers to the forwarding control module management table 412 of FIG. 10 by the group address, and specifies the forwarding control module for the group address (step 3301). The gateway checks the domain name of the group address (step 3302). When the group address is SIP URI, the domain name is attached to the part after at mark. When the domain name indicated by the group address is same as the belonging domain of the gateway, the BYE is sent to the press-talk server of the same domain (step 3303). The destination of the BYE is the group address. Thereafter, when receiving OK response for the BYE from the press-talk server, the gateway ends the procedure (step 3304). At step 3302, when the domain name indicated by the group address is not different from the belonging domain of the gateway, the BYE is transferred to the gateway of the domain indicated by the group address (step 3305). The destination of the BYE is the group address. Thereafter, when receiving the OK response for the BYE from the gateway to witch the BYE is transferred, the gateway ends the procedure (step 3306).

As shown in FIG. 30, the BYE including the address list is processed in the gateway, so that the BYE messages from the press-talk server to the gateway are aggregated, and the number of times of sending can be reduced. This results in the saving of communication resource and the shortening of call disconnection time taken before press-talk is ended.

The gateway includes both the procedures equivalent to the protocol conversions for the mobile station address and the base station address of FIGS. 31 and 32, and the communication system is provided which can perform the semi-duplex many-to-many multicasting service for both the mobile station and the base station by using the worldwide standard of call control protocol such as the SIP on the IP network, and can contain mobile stations and base stations of plural existing wireless facilities not supporting the standard call control protocol such as the SIP.

The present invention can be applied to various radio terminals in addition to the mobile station. Besides, with respect to the protocol, the signal format and the like, the invention can be applied to an appropriate one according to the communication network and the system.

What is claimed is:

1. A communication system in which a press-talk call start request is received from a mobile station in a group and semi-duplex many-to-many multicasting service to other mobile stations as members of press-talk is realized, the communication system comprising:

a first press-talk server that sends a first call control signal of multicasting service including a group address as an identifier of the press-talk and an address list of one or more mobile station addresses as members of the press-talk or one or more base station addresses to a second gateway in order to perform call connection to a member of the press-talk belonging to the second gateway different from a first gateway which communicates with a first base station receiving the press-talk call start request, wherein when receiving the first call control signal of the multicasting service, the second gateway extracts all addresses specified as destinations from the address list, (1) where the extracted addresses are mobile station addresses, the second gateway searches, based on a mobile station number for each mobile station address included in the address list included in the first call control signal of the multicasting service, a mobile station location information table storing mobile station numbers of the mobile stations and base station numbers of base stations having the mobile stations under the base stations, when a press-talk call of the press-talk is not set up for the specified second base station, the second gateway sends press-talk call setup indication to the second base station, when receiving the press-talk call setup indication, the second base station performs radio channel configuration to perform press-talk to the one or more mobile stations under the second base station included in the address list, (2) where the extracted destination addresses are base station addresses, when press-talk call is not set for the second base station of each base station address included in the address list included in the first call control signal of the multicasting service, the second gateway sends press-talk call setup indication to the second base station, when receiving the press-talk call setup indication, the second base station performs radio channel configuration to deliver the press-talk, and wherein the gateway realizes the semi-duplex many-to-many multicasting service to both communication of the first call control signal of the multicasting service to the mobile station from the first press-talk server and communication of the first call control signal of the multicasting service to the second base station.

2. The communication system according to claim 1, wherein the first gateway receives the multicasting service call start request requested by the certain mobile station, sends the call control signal of the multicasting service to the first press-talk server, determines, when a provisional response to the call control signal is received from the first press-talk server, that the provisional response is a call control signal for performing the multicasting service to the mobile station specified as the mobile station of the press-talk from the first press-talk server, specifies the first base station where the mobile station making the press-talk call start request exists, sends the press-talk call setup indication for performing the press-talk call connection to the first base station, and the first base station performs radio channel configuration for the one or more mobile stations under the first base station of the first base station to perform the press-talk.

3. The communication system according to claim 1, wherein the first press-talk server includes a group member table in which a group address as an identifier of press-talk and an address of a press-talk member are previously stored, a group address of the multicasting service managed by a second press-talk server belonging to other system or network is set up as an address of the press-talk member, and the first press-talk server sends the call control signal of the multicasting service to the group address.

4. The communication system according to claim 3, wherein the first gateway further receives the call control signal sent by the first press-talk server to a group address of multicasting service communication-managed by the second press-talk server belonging to the other system or network, and sends the call control signal to the second press-talk server or a third gateway belonging to the other system or network.

5. The communication system according to claim 1, further comprising:

a mobile station specific table to store specific information including information of whether press-talk is made an enabled service or not for a mobile station address; and a call control server that, when a location registration request is received from a mobile station through the first gateway, refers to the mobile station specific table, and sends specific information for the mobile station to the first gateway.

6. The communication system according to claim 5, wherein the first gateway includes a management table to store specific information including information of whether press-talk is made an enabled service for a mobile station or a base station address, and stores specific information for the mobile station received from the call control server into the management table.

7. The communication system according to claim 1, wherein the first press-talk server sends the call control signal of the multicasting service to one or more mobile stations or one or more base stations, and when the call control signal of the multicasting service passes through one gateway, an address list of the one or more mobile stations or the one or more base stations is included in the call control signal, and the first press-talk server sends the call control signal to the second gateway.

8. The communication system according to claim 7, wherein where the second gateway receives the call control signal including the address list sent by the first press-talk server, and when a call is not set up in a group for all addresses of the one or more mobile stations included in the address list of the call control signal or all addresses of the one or more base stations, the second gateway sends press-talk call setup indication to the base station corresponding to the press-talk.

9. The communication system according to claim 8, wherein when a response to the call control signal including the address list is sent to the first press-talk server, the second gateway attaches the address list of one or more mobile stations as addresses for which press-talk call is set up or the address list of one or more base stations to the response.

10. The communication system according to claim 1, wherein when a group address of press-talk of other system or network is included in addresses of the press-talk, the first press-talk server transfers a second call control signal of the multicasting service including a group address of press-talk of the other system or network to a third gateway of the other system or network, when receiving the second call control signal of the multicasting service, the third gateway sends the second call control signal of the multicasting service to a second press-talk server of the other system or network, and the second press-talk server searches, by the group address, a group member table in which group addresses and press-talk member addresses are previously stored, and executes a procedure of starting call connection to the press-talk member address included in the group member table.

11. The communication system according to claim 10, wherein when a call connection procedure for all members of the press-talk is completed, the second press-talk server sends a confirmation response to the first press-talk server through the third gateway, when the call connection procedure for all members of the press-talk is completed, the first press-talk server sends a confirmation response to the first gateway, the first gateway sends back call setup acceptance to the first base station, and the first base station notifies call setup completion to the mobile station which sent the press-talk call start request.

12. The communication system according to claim 1, wherein when the address included in the address list is the group address as the identifier of the press-talk, one of the gateways which extracts the address checks a domain name of the group address, (1) where the domain name of the group address and a domain to which the gateway belongs are identical to each other, the gateway sends the call control signal of the multicasting service to the press-talk server of the domain, the press-talk server searches, by the group address as the identifier of the press-talk, a first group member table in which group addresses as identifiers of press-talk and press-talk member addresses are previously stored, and shifts to a procedure of starting call connection to the group member address included in the first group member table, and then, when receiving confirmation response to the call control signal of the multicasting service from the press-talk server, the gateway ends the procedure, (2) where the domain name of the group address and the domain to which the gateway belongs are different from each other, the gateway transfers the call control signal of the multicasting service to another gateway belonging to the domain of the group address, the other press-talk server belonging to the domain searches, by the group address as the identifier of the press-talk, a second group member table in which group addresses as identifiers of press-talk and press-talk member addresses are previously stored, and shifts to a procedure of starting call connection to a group member address included in the second group member table, and then, when receiving the confirmation response to the call control signal of the multicasting service from the other gateway which transferred the call control signal of the multicasting service, the gateway ends the procedure.

13. The communication system according to claim 1, wherein the first base station receives the press-talk call start request from the mobile station under the first base station, the first base station sends a press-talk call request including the mobile station number of the mobile station which sent the start request and the group address as the identifier of the start-requested press-talk, when receiving the press-talk call request, the first gateway transfers a call control signal of multicasting service including the mobile station address of the mobile station which sent the start request and the group address as the identifier of the start-requested press-talk to the first press-talk server, the first press-talk server sends a provisional response of the call control signal of the multicasting service to the first gateway, the first gateway searches the mobile station location information table, and specifies the first base station where the mobile station having sent the press-talk call start request exists, the first gateway sends press-talk call setup indication to perform call connection of press-talk to the first base station, the first base station performs radio channel configuration to perform press-talk for one or more mobile stations under the first base station, and the first press-talk server searches, by the group address as the identifier of press-talk, a group member table in which group addresses as identifiers of press-talk and member addresses of press-talk are previously stored, and shifts to a procedure of starting call connection to the group member address included in the group member table.

14. The communication system according to claim 1, wherein the first press-talk server sends a release request including a group address and a list of a mobile station address of the second gateway to disconnect a call of a group member, when receiving the release request, the second gateway searches the mobile station location information table by the mobile station number to each mobile station address included in the address list, and specifies the second base station of the mobile station, when a press-talk call of the press-talk is not released for the second base station, the second gateway sends release completion to the second base station, and when receiving the release completion, the second base station releases the radio channel in which the press-talk is performed.

15. The communication system according to claim 1, wherein the first press-talk server sends a release request including a group address as an identifier of press-talk and a list of a base station address of the second gateway to the second gateway to disconnect the call of a group member, when receiving the release request, the second gateway sends release completion to the second base station when the press-talk call of press-talk is not released for the second base station to each base station address included in the address list, and when receiving the release completion, the second base station releases the radio channel in which the press-talk is performed.

16. A gateway in a communication system in which a press-talk call start request is received from a mobile station in a group and semi-duplex many-to-many multicasting service to other mobile stations as members of press-talk is realized, comprising:

a second gateway receives a first call control signal of multicasting service including a group address as an identifier of the press-talk and an address list of one or more mobile station addresses as members of the press-talk or one or more base station addresses from a first press-talk server in order to perform call connection to a member of the press-talk belonging to the second gateway different from a first gateway which communicates with a first base station receiving the press-talk call start request, wherein when receiving the first call control signal of the multicasting service, the second gateway extracts all addresses specified as destinations from the address list, (1) where the extracted addresses are mobile station addresses, the second gateway searches, based on a mobile station number for each mobile station address included in the address list included in the first call control signal of the multicasting service, a mobile station location information table storing mobile station numbers of the mobile stations and base station numbers of base stations having the mobile stations under the base stations, when a press-talk call of the press-talk is not set up for the specified second base station, the second gateway sends press-talk call setup indication to the second base station, the second gateway makes the second base station perform radio channel configuration to perform press-talk to the one or more mobile stations under the second base station included in the address list, when the second base station receives the press-talk call setup indication, (2) where the extracted destination addresses are base station addresses, when press-talk call is not set for the second base station of each base station address included in the address list included in the first call control signal of the multicasting service, the second gateway sends press-talk call setup indication to the second base station, the second gateway makes the second base station perform radio channel configuration to deliver the press-talk, and wherein the gateway realizes the semi-duplex many-to-many multicasting service to both communication of the first call control signal of the multicasting service to the mobile station from the first press-talk server and communication of the first call control signal of the multicasting service to the second base station.

17. The gateway in the communication system according to claim 16, wherein when the address included in the address list is the group address as the identifier of the press-talk, one of the gateways which extracts the address checks a domain name of the group address, (1) where the domain name of the group address and a domain to which the gateway belongs are identical to each other, the gateway sends the call control signal of the multicasting service to the press-talk server of the domain, after the press-talk server shifts to a procedure of starting call connection, when receiving confirmation response to the call control signal of the multicasting service from the press-talk server, the gateway ends the procedure, (2) where the domain name of the group address and the domain to which the gateway belongs are different from each other, the gateway transfers the call control signal of the multicasting service to another gateway belonging to the domain of the group address, after the other press-talk server belonging to the domain shifts to a procedure of starting call connection, when receiving the confirmation response to the call control signal of the multicasting service from the other gateway which transferred the call control signal of the multicasting service, the gateway ends the procedure.

18. The gateway in the communication system according to claim 16, wherein the first gateway receives the multicasting service call start request requested by the certain mobile station, sends the call control signal of the multicasting service to the first press-talk server, determines, when a provisional response to the call control signal is received from the first press-talk server, that the provisional response is a call control signal for performing the multicasting service to the mobile station specified as the mobile station of the press-talk from the first press-talk server, specifies the first base station where the mobile station making the press-talk call start request exists, sends the press-talk call setup indication for performing the press-talk call connection to the first base station, and the first base station performs radio channel configuration for one or more mobile stations under the first base station of the first base station to perform the press-talk.

19. The gateway in the communication system according to claim 16, wherein the first gateway further receives the call control signal sent by the first press-talk server to a group address of multicasting service communication-managed by a second press-talk server belonging to the other system or network, and sends the call control signal to the second press-talk server or a third gateway belonging to the other system or network.

20. The gateway in the communication system according to claim 16, wherein where the second gateway receives the call control signal including the address list sent by the first press-talk server, and when a call is not set up in a group for all addresses of the one or more mobile stations included in the address list of the call control signal or all addresses of the one or more base stations, the second gateway sends press-talk call setup indication to the base station corresponding to the press-talk.

* * * * *